United States Patent [19]

Nagase

[11] Patent Number: 5,521,920
[45] Date of Patent: May 28, 1996

[54] TIME-DIVISION MULTIPLEXER WITH REDUCED DELAY TIME

[75] Inventor: Yoshiaki Nagase, Hyogo, Japan

[73] Assignee: Mitsubishi Denki Kabushiki Kaisha, Tokyo, Japan

[21] Appl. No.: 354,782

[22] Filed: Dec. 12, 1994

[30]     Foreign Application Priority Data

Dec. 27, 1993   [JP]   Japan .................................. 5-332656

[51] Int. Cl.⁶ ..................................................... H04J 3/02
[52] U.S. Cl. ........................... 370/68; 370/100.1; 370/112
[58] Field of Search ............................ 370/63, 68, 100.1, 370/105, 105.1, 108, 112; 375/354, 372

[56]                 References Cited

U.S. PATENT DOCUMENTS

| | | | |
|---|---|---|---|
| 4,941,141 | 7/1990 | Hayano | 370/100.1 |
| 4,999,832 | 3/1991 | Chen et al. | 370/85.14 |
| 5,123,012 | 6/1992 | Suzuki et al. | 370/68 |
| 5,257,260 | 10/1993 | Breidenstein et al. | 370/84 |
| 5,331,632 | 7/1994 | Aaron et al. | 370/68 |

FOREIGN PATENT DOCUMENTS

| | | |
|---|---|---|
| 0176437 | 4/1986 | European Pat. Off. . |
| 0378122 | 7/1990 | European Pat. Off. . |
| 0453129 | 10/1991 | European Pat. Off. . |
| 60-143084 | 7/1985 | Japan . |
| 62-216438 | 9/1987 | Japan . |
| 276436 | 3/1990 | Japan . |

*Primary Examiner*—Benedict V. Safourek
*Attorney, Agent, or Firm*—Rothwell, Figg, Ernst & Kurz

[57]                 ABSTRACT

A multiplexer having the capability of multiplexing/demultiplexing data with reduced delay caused by exchanging data. The time-division multiplexer of the invention includes a plurality of time-slot-conversion memories which can write/read the data consisting of specific multi-frames with a specific frame unit, a write-timing pulse generator which generates write/read timing to a multi-frame alignment memory with a specific frame unit. The multiplexer transmits/receives the data to/from the transmission interface or the terminal interface with the specific frame unit. Another kind of multiplexer of the invention includes a distributed time-slot-conversion memory which can write/read the data with a specific frame unit and a selector. The multiplexer transmits/receives the data to/from the transmission interface, the terminal interface, the transmission line, or the terminal with a specific frame unit.

15 Claims, 31 Drawing Sheets

[RELAED ART]

TIME-DIVISION MULTIPLEXER WITH REDUCED DELAY TIME

BACKGROUND OF THE INVENTION

1. Field of the Invention

The present invention relates to a time-division multiplexer which multiplexes/demultiplexes data and which includes relaying.

2. Description of the Related Art

FIG. 19 shows an example of a conventional multiplexer/demultiplexer located at a transmitting/receiving node.

In the figure, a timing pulse generator (PG) 1 generates and controls various kinds of timing pulses. A terminal interface 2 connects and controls the interface to terminals. Data from the terminal interface 2 are exchanged using a time-slot interchanger (TSI) 3 connected to a transmission interface 4. The transmission interface 4 is connected to and controls the interface to a transmission line. A multiplexing/demultiplexing bus 5 for received data multiplexes/demultiplexes received data from each interface to the TSI 3. A multiplexing/demultiplexing bus 6 for transmitting data multiplexes/demultiplexes transmitting data from the TSI to each interface. The timing pulses of nodes generated by the PG 1 are received and transmitted by a bus 7.

FIG. 20 shows an example of multiplexing/demultiplexing at a relay node according the conventional bit multiplexing system. The same reference numbers and legends are used for elements which are the same or similar to the elements shown in FIG. 19, for the sake of clarity. A transmission Interface 8 connects and controls the interface to a transmission line.

FIG. 21 shows signal timings at the relay node of the conventional bit multiplexing system. The reference numbers 401, 402, etc., refer to the signals shown in FIG. 20. The direction of writing/reading the data to/from the time-slot-conversion memories A, B in the TSI is reversed every multi-frame (every 20 frames).

FIG. 22 shows signal timings of receiving the data at the transmission interface of the conventional bit multiplexing system. The reference numbers 401, 402, etc., refer to the signals shown in FIGS. 19 and 20. The clock pulse rated of transmission line extract clock 405 differs from that of internal bus clock 406 of the node, so that the transmission speed of the data must be converted. Thus, asserted bits of signal 403 are transmitted from the transmission line.

FIG. 23 illustrates an example of a network of channels of the bit multiplexing system. In the figure, data is transmitted from/received at transmitting/receiving nodes N1, N2 and N4 and the data is relayed at a relay node N3. A transmission line (A) is between N1 and N3, a transmission line (B) is between N2 and N3, and a transmission line (C) is between N3 and N4. There are five terminals a, b, c, d and e at N1. The "terminals a and b" at N1 are connected to "terminals a' and b'" at N2 through N3, respectively. The "terminals c, d and e" at N1 are connected to "terminals c', d' and e'" at N4 through N3, respectively. Channels are defined as follows: from "terminal a" to "terminal a'", N1–N3 is defined as "channel a" and N3–N2 as "channel a'"; from "terminal b" to "terminal b'", N1–N3 as "channel b" and N3–N2 as "channel b'"; from "terminal c" to "terminal c'", N1–N3 as "channel c" and N3–N4 as "channel c'"; from "terminal d" to "terminal d'", N1–N3 as "channel d" and N3–N4 as "channel d'"; and from "terminal e" to "terminal e'", N1–N3 as "channel e" and N3–N4 as "channel e'". Data are transmitted at a different speed in each channel as follows: in channels a, a' at 8 kbps; in channels b, b' at 9.6 kbps; in channels c, c' at 4.8 kbps; in channels d, d' at 9.6 kbps; and in channels e, e' at 400 bps.

At the relay node, each channel is assigned to each of the transmission lines between two nodes. The data is exchanged at the relay node with a channel unit.

FIG. 24 shows a configuration of the time-slot-conversion memories A, B in the TSI, namely, the time-slot-conversion memories 32, 33 shown in FIGS. 19 and 20. In the figure, Z shows a number of bits included in one frame of the multiplexing/demultiplexing bus in the node.

In this configuration, the capacity of the time-slot-conversion memories becomes 2×20×Z=40Z (addresses) including the time-slot-conversion memories A and B.

In the following explanation, x and y of (x, y) show a bit number corresponding to the frame and a multi-frame number, respectively. (x, y) shows a specific address in the time-slot-conversion memory. In the same way, in FIGS. 25–29, (x, y) indicates a specific address in the time-slot-conversion memory, i.e., (1, 19) shows the first memory element of the nineteenth frame.

FIGS. 25–29 show examples of the operation of the TSI at the relay node of the conventional bit multiplexing system.

FIG. 25 shows a frame-assignment to "channel a" in the transmission line (A) and "channel a'" in the transmission line (B) (from "terminal a" at N1 to "terminal a'" at N2 through N3). The same assignment is given to the received/transmitting data in the time-slot-conversion memory in the TSI at N3.

In FIG. 25, 1' (p+m, 1) indicates data 1' is written in/read from an address (p+m, 1) in the time-slot-conversion memory. The direction of writing/reading the data to/from the time-slot-conversion memories A and B in the TSI is reversed every multi-frame.

In the same way, FIG. 26 shows a frame-assignment to "channel b" and "channel b'" shown in FIG. 23 and assignment in the time-slot-conversion memory. FIG. 27 shows a frame-assignment to "channel c" and "channel c'" shown in FIG. 23 and an assignment in the conversion memory. FIG. 28 shows a frame-assignment "channel d" and "channel d'" shown in FIG. 23 and an assignment in the conversion memory. FIG. 29 shows a frame-assignment to "channel d" and "channel d'" shown in FIG. 23 and an assignment in the conversion memory.

FIG. 30 illustrates an example of a network of paths and channels of another conventional multiplexing system, the so-called "bit-octet multiplexing system".

In the figure, N1, N2 and N4 show transmitting/receiving nodes and N3 shows a relay node. In tills system, a path is defined and used in each transmission line From the receiving node to the transmitting node according to transmission speed of data, 64 kbps×n. Channels are assigned respectively in each path. The data is switched with a path unit at N3. In the figure, a path "circle 1" is from N1 to N2 (N1–N3 –N2), in which a channel from "terminal a" at N1 to "terminal a'" at N3 and another channel from "terminal b" at N1 to "terminal b'" at N3 are assigned. In another path "circle 2" from N1 to N4 (N1–N3–N4), channels are assigned in the same way.

FIG. 31 shows an example of the operation of the TSI at the relay node of the conventional bit-octet multiplexing system. In the figure, the data is also switched in the TSI at N3 with a path unit.

In the following, demultiplexing and multiplexing data at the transmitting/receiving node will be explained.

The system for multiplexing data from the terminal to the transmission line will be explained first. FIG. 19 shows multiplexing/demultiplexing data at the transmitting/receiving node according to the conventional bit multiplexing system. Terminal data 201, which is received by a receiver 21 In the terminal interface 2, is written in a timing-conversion buffer memory 22 by a terminal clock pulse (204/205), which is received by a receiver 26. The data 201 is output to the multiplexing/demultiplexing bus 5 for received data as a signal 203 by a read-timing pulse 206 from the timing bus 7, and is written In the time-slot-conversion memory 32/33 as a signal 302/303 by a timing pulse 305/306/307 through a selector 31 in the TSI 3. The data is then transmitted to the multiplexing/demultiplexing bus 6 for transmitting data as a signal 304 by the timing pulse 305/306/307 through the selector 31, and is written in a timing-conversion buffer memory 47 as a signal 410 by a write-timing pulse 413 from the timing bus 7. The data is read as a signal 411 by a clock pulse 415 of a transmission line clock 46 and is output as a signal 412 to the transmission line by a driver 48.

Demultiplexing of data from the transmission line to the terminal will be explained below. Transmission line data 401, which is received by a receiver 41 in the transmission interface 4, is written in a timing-conversion buffer memory 43 as a signal 402 by a clock pulse 405, which is extracted by a transmission line clock extractor 42. The data is read by a read-timing pulse 406 from the timing bus 7. A multi-frame synchronization detector detects a multi-frame synchronizing bit, and the data is written in an MFA (multi-frame alignment memory) 45 as a signal 403 based on a multi-frame phase signal 407. The data is transmitted to the multiplexing/demultiplexing bus 5 for received data as a signal 404 by a read-timing pulse 408 from time timing bus 7. The data is thus written in the time-slot-conversion memory 32/33 as the signal 302/303 by the timing pulse 305/306/307 from the timing bus 7 through the selector 31 in the TSI 3.

The data is then output to the multiplexing/demultiplexing bus 6 for transmitting data as the signal 304 by the timing pulse 305/306/307 and is written in a timing-conversion buffer memory 24 of the terminal interface 2 as a signal 207 by a write-timing pulse 210 from the timing bus 7. The data is read and transmitted as a signal 208 by a clock pulse 212 of a terminal clock 23, and transmitted to the terminal as a signal 209 by a driver 2S. The terminal clock pulse is also output to the terminal by a driver 27.

A simultaneous timing generator 12 generates timing pulses 102, which were described above as various kinds of timing pulses. The PG 1 outputs the timing pulses 102 to the timing bus 7 through a bus driver 11 as signals 101.

A delay which occurs in multiplexing/demultiplexing will be explained with reference to the above figures and FIG. 22. In the configuration as shown in FIG. 19, the MFA 45 has to absorb a phase difference between multi-frame phase of the received data from the transmission line and internal multi-frame phase of the node (read timing from the timing bus 7), which causes a delay of one multi-frame (in this example, 2.5 msec (125 μsec×20) at maximum because one multi-frame consists of 20 frames.

The time-slot-conversion memories 32 and 33 in the TSI 3 have to absorb a phase difference between the write timing from the timing bus 7 and read timing from the timing bus 7, which also causes a delay.

In the same way, In case of transmitting data to the transmission line, a delay occurs because the time-slot-conversion memories 32 and 33 in the TSI 3 have to absorb a phase difference between the write timing from the timing bus 7 and the read timing from the timing bus 7.

Multiplexing/demultiplexing the data at the relay node of the conventional bit multiplexing system is explained below with reference to FIG. 20. The operation of multiplexing/demultiplexing data at the relay node is similar to the operation at the transmitting/receiving node.

Transmission line data 801, which is received in the transmission interface 8, is written in a timing-conversion buffer memory 83 as a signal 802 and is read as a signal 803 by a read-timing pulse 806 from the timing bus 7. Multi-frame synchronizing bit is detected and the data is written in MFA (multi-frame alignment memory) 85 based on a multi-frame phase signal 807 of the received data. The data is output to the multiplexing/demultiplexing bus 5 for the received data as a signal 804 by a read-timing pulse 808 from the timing bus 7, and is written in the time-slot-conversion memory 32/33 in the TSI 3 as the signal 302/303 by the timing pulse 305/306/307.

The data is transmitted to the multiplexing/demultiplexing bus 6 for the transmitting data as the signal 304 by the timing pulse 305/306/307, and is written in the timing-conversion buffer memory 47 in the transmission interface 4 as the signal 410 by the write-timing pulse 413. This is read as the signal 411 by the clock pulse 415 and output to the transmission line as the signal 412. In case of relaying data from the transmission line (B) to the transmission line (A), the operation is the same as described above.

The simultaneous timing generator 12 generates the timing pulses 102, which were described above as various kinds of timing pulses. The PG 1 outputs the timing pulses 102 to the Liming bus 7 through the bus driver 11 as signals 101.

The MFA 85 has to absorb a phase difference between multi-frame phase of the received data from the transmission line (A) and internal multi-frame phase of the node (read timing from the timing bus 7), which causes a delay of one multi-frame (in this example, 2.5 msec (125 μsec×20) at maximum because one multi-frame consists of 20 frames).

The time-slot-conversion memories 32 and 33 in the TSI 3 have to have capacity 2 multi-frame size for exchanging data with a multi-frame unit to/from the channel. This causes a delay of one multi-frame (in this example, 2.5 msec (125 μsec×20) as shown by t3 in FIG. 21 because one multi-frame consists of 20 frames).

Another conventional "bit-octet multiplexing" system will be explained in the following. The operation at the transmitting/receiving node is the same as the operation of the conventional bit multiplexing system, and is not explained here. At the relay node, the operation is almost the same as the bit multiplexing system. In the bit-octet multiplexing system, however, data is not exchanged with a channel unit, but an octet unit (64 kbps). The delay caused by exchanging data becomes one frame (125 μsec) at the time-slot-conversion memories 2 and 33 in the TSI 3.

In this system, the delay at the relay node becomes shorter than the bit multiplexing system, but multiplexing efficiency is less than the bit multiplexing system because the data is relayed with a path unit of octet (64 kbps) regardless of existence of signals.

Problems Solved by the Invention

In the conventional time division multiplexer configured as described above, the data has to be exchanged, including the multi-frame phase, so that the delay caused by exchanging for multiplexing/demultiplexing the data including relaying becomes large. Another problem is that the time-slot-conversion memory in the TSI has to have a large capacity.

SUMMARY OF THE INVENTION

To solve the above and other problems, an object of this invention is to provide a time-division multiplexer which can multiplex/demultiplex data with a shorter delay caused by exchanging the data, and in which the capacity of the time-slot-conversion memory in the TSI can be reduced.

According to the invention, a time-division multiplexer using a multi-frame format receives data from transmission lines/terminals and transmits the data to another transmission lines/terminals in a communication system. One embodiment includes the following:

(A) a multi-frame-alignment memory for aligning read-timing of the data with write-timing of the data from one of the transmission lines;

(B) a plurality of time-slot-conversion memories including means for writing the data from the multi-frame-alignment memory in the form of multi-frame formats each with a selected number of frame units in each multi-frame segment based on the transmission speed of the sending terminal and efficiency of the communication system and for reading the written multi-frame format data; and (C) a timing pulse generator for providing read-timing of the data from the multi-frame-alignment memory in the multi-frame format having a selected number of frame units in each multi-frame segment, and for providing write-/read-timing of the multi-frame format data to/from the time-slot-conversion memories.

According to another embodiment of the invention, a time-division multiplexer using a multi-frame format receives data from transmission lines/terminals and transmits the data to other transmission lines/terminals in a communication system. The time-division multiplexer includes the following:

(A) a plurality of distributed time-slot-conversion memories placed in the transmission interface for writing the data from one of the terminals, and for reading the data from the distributed time-slot-conversion memory in the form of multi-frame formats each with a selected number of frame units in each multi-frame segment based on the transmission speed of the sending terminal and efficiency of the communication system and for reading the written multi-frame format data;

(B) a selector for selecting the distributed time-slot-conversion memories before writing/reading the data for receiving/transmitting; and, (C) a timing pulse generator for providing read-timing of the data from the distributed time-slot-conversion memories in the multi-frame format having the selected number of frame units in each multi-frame segment, and for switching the selectors with the selected number of frame units.

According to another embodiment of the invention, a time-division multiplexer using a multi-frame format receives data from transmission lines/terminals and transmits the data to other transmission lines/terminals in a communication system. The time-division multiplexer includes the following:

(A) a multi-frame-alignment memory for aligning read-timing of the data with write-timing of the data From one of the transmission lines;

(B) a plurality of distributed time-slot-conversion memories placed in the transmission interface for writing the data from the multi-frame-alignment memory, and for reading the data from the distributed time-slot-conversion memory in the form of multi-frame formats each with a selected number of frame units in each multi-frame segment based on the transmission speed of the sending terminal and efficiency of the communication system and for reading the written multi-frame format data;

(C) a selector for selecting the distributed time-slot-conversion memories before writing/reading the data for receiving/transmitting; and (D) a timing pulse generator for providing read-timing of the data from the distributed time-slot-conversion memories in the multi-frame format having the selected number of frame units in each multi-frame segment, and for switching the selectors with the selected number of frame units.

According to one embodiment of the invention, a method is provided for multiplexing data from transmission lines/terminals in a communication system, including a plurality of time-slot-conversion memories. This embodiment includes the steps of:

(A) receiving data From one of the transmission lines through a buffer memory to a multi-frame-alignment memory with each of specific frame units;

(B) transmitting the data from the multi-frame-alignment memory to the time-slot-conversion memory in the form of multi-frame formats each with a selected number of frame units In each multi-frame segment based on the transmission speed of the sending terminal and efficiency of the communication system; and (C) transmitting the data from the time-slot-conversion memory to other buffer memory for the terminal.

Other objects, features, and advantages of the invention will be apparent from the following description when taken In conjunction with the accompanying drawings.

DETAILED DESCRIPTION OF THE INVENTION

Embodiment 1

Figure 1:
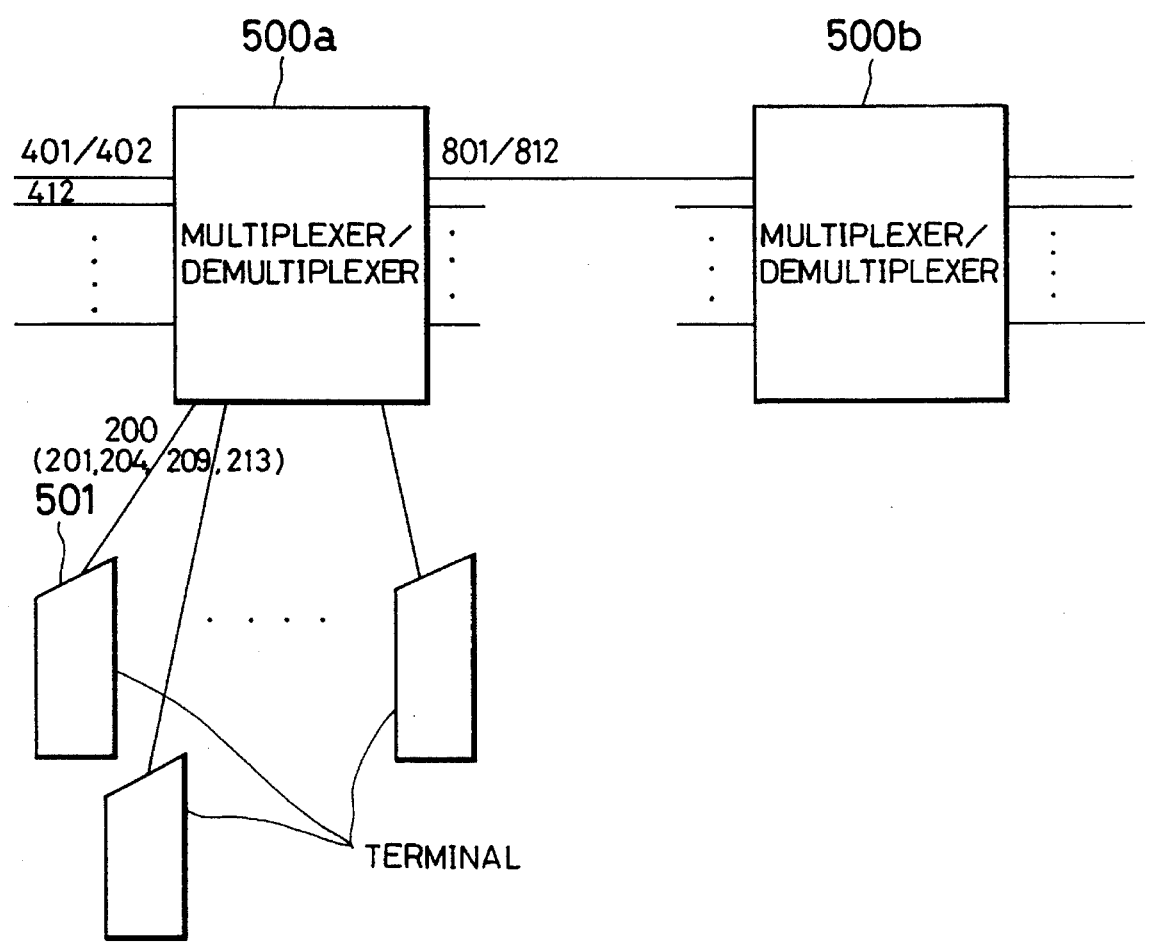
FIG. 1 shows a data transmission system with multiplexers/demultiplexers provided at a transmitting/receiving node and a relay node according to one embodiment of the invention.

FIG. 1 shows time-division multiplexers 500a and 500b according to one embodiment of the invention located in a whole system. In the figure, the multiplexers are provided at a transmitting/receiving node and a relay node of a communication system.

In one ease, the multiplexer 500a transmits data From one of terminals 501 to another terminal connected to another multiplexer. In this ease, the multiplexer 500a is used as the transmitting node. In another ease, the multiplexer 500a is used as the receiving node when data from another terminal through another multiplexer is received by the multiplexer 500a to transmit to one of the terminals 501. The multiplexer 500a is connected to terminals with lines 200. In the following explanation, which refers to FIGS. 2 and 3, data 201, 209 and clock pulses 204, 213 are transmitted between the terminal and the multiplexer. The multiplexer 500b transmits data from the transmitting node to the receiving node. In this case, the multiplexer 500b is used as the relay node. In the following explanation, data 401, 412, 801, and 812 are transmitted between the multiplexers through the transmission lines.

Figure 2:
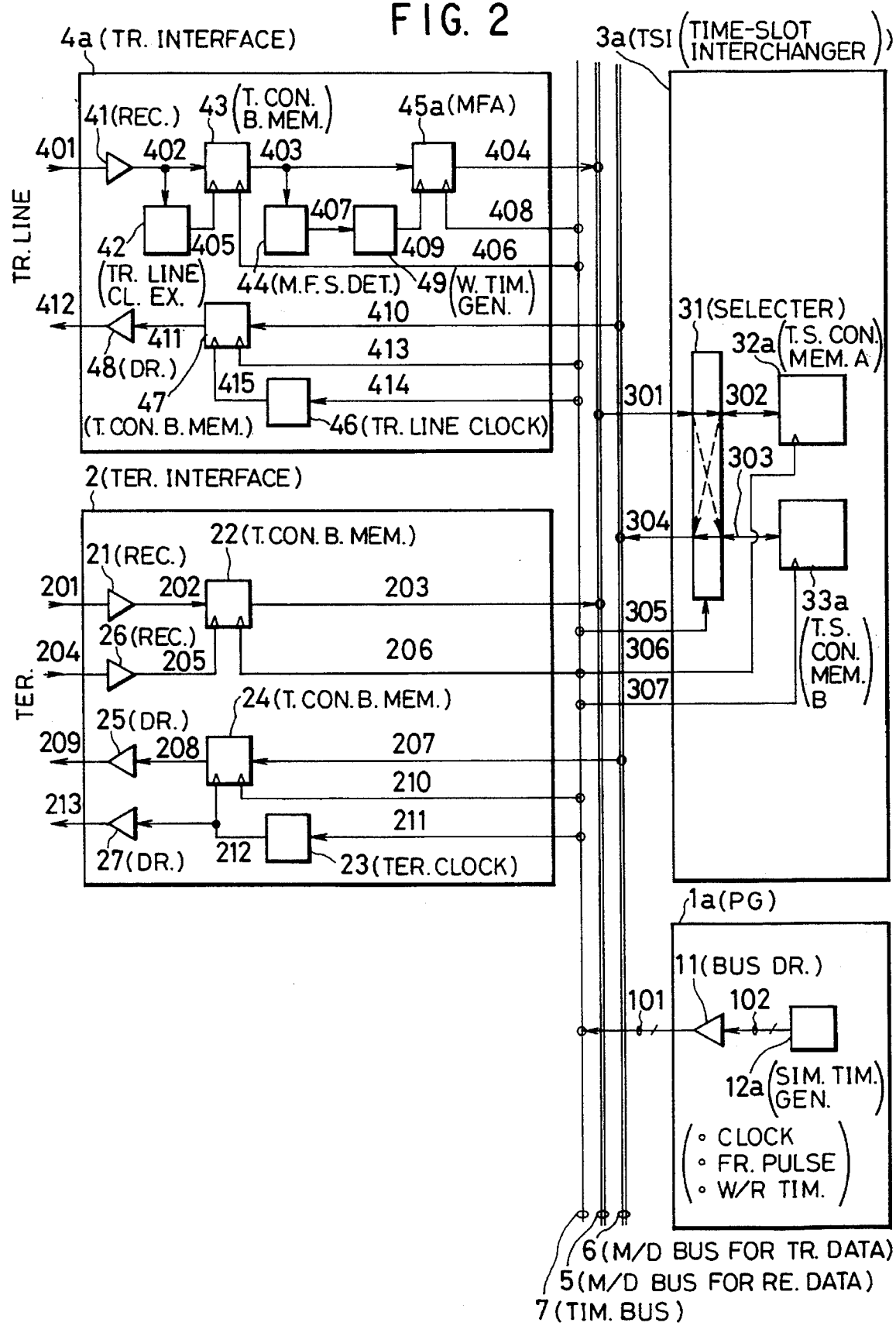
FIG. 2 shows the circuit configuration of the multiplexer provided at the transmitting/receiving node according to a bit multiplexing system of the invention.
Figure 3:
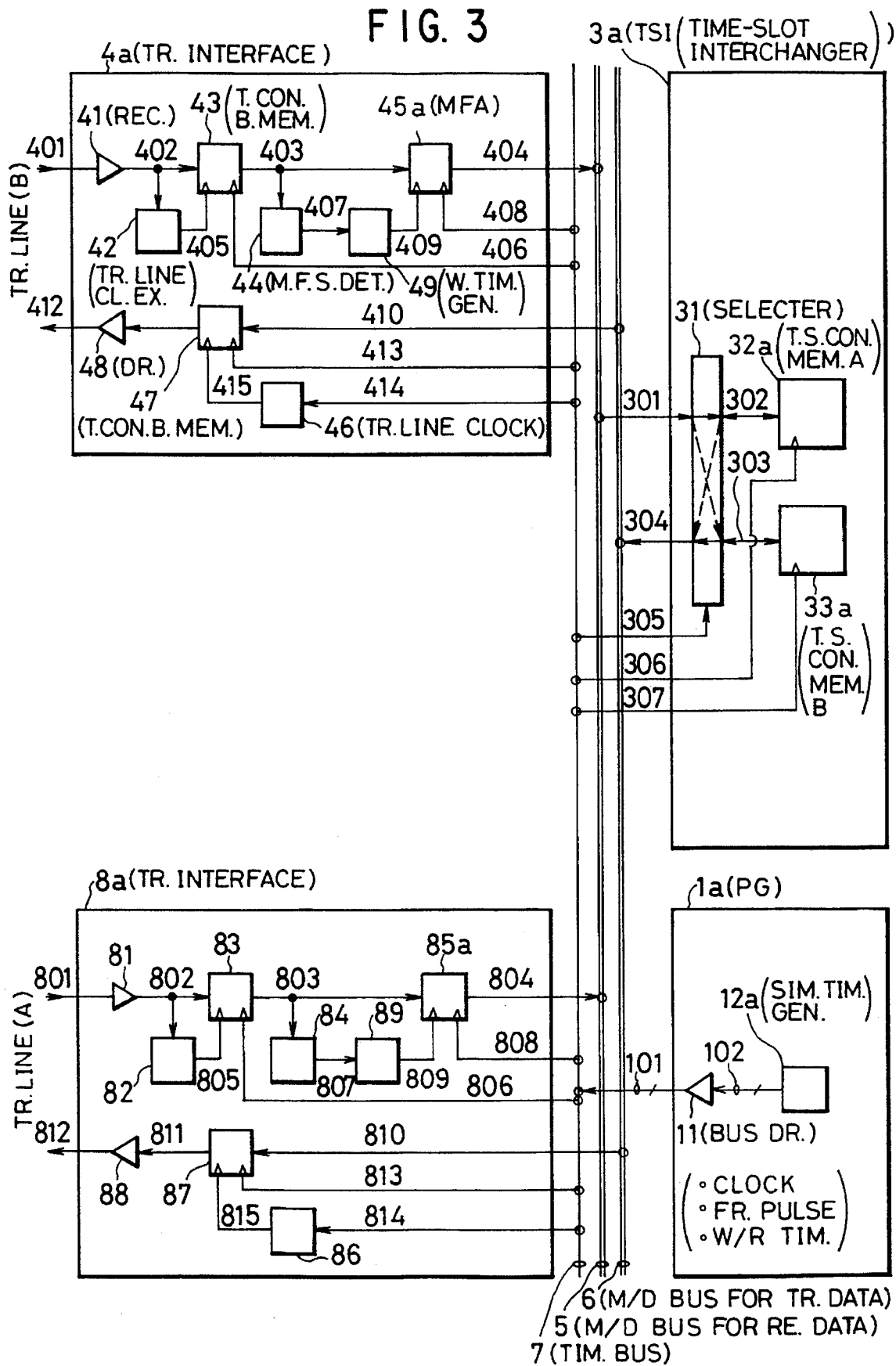
FIG. 3 shows the circuit configuration of the multiplexer provided at the relay node.

The main parts of the configuration of the multiplexers 500a and 500b are shown in FIGS. 2 and 3.

In the following, a configuration and an operation of the time-division multiplexer according to the first embodiment of the invention will be explained.

FIG. 2 shows the configuration of the multiplexer which multiplexes/demultiplexes at the transmitting/receiving node of a bit multiplexing system according to the first embodiment. As shown in FIG. 2, a timing pulse generator (PG) 1a has a simultaneous timing generator 12a. The simultaneous timing generator generates a timing pulse which is changeable according to the transmission speed of the data In each channel, while the simultaneous timing generator of the conventional system generates write/read timing with a fixed frame unit, for example, 20 Frames. Time-slot-conversion memories 32a and 33a in a time-slot interchanger (TSI) 3a write/read the data to/from each channel with a frame unit which is specified according to a partner which the data is transmitted to/received from. For example, the frame unit is determined according to transmitting/receiving speed of the data, 4.8 kbps of the terminal interface. A multi-frame alignment memory (MFA) 45a also writes/reads the data to/from each channel with the specific frame unit.

The timing pulse generator 1a generates various timing pulses for selecting appropriate multi-frame segments. The multiplexer also has ROM or RAM storing the various timings for selecting appropriate multi-frame segments based on the transmission speed of a sending terminal or a receiving terminal and efficiency of the communication system. Then the multiplexer selects the number of frame units in each multi-frame segment based on the transmission speed and efficiency.

FIG. 3 shows the configuration of the multiplexer which multiplexes/demultiplexes at the relay node according to the bit multiplexing system of the invention. In FIG. 3, elements 1a, 3a, 4a, and 5–7 operate in the same manners as elements 1a, 3a, 4a, and 5–7 shown in FIG. 2 and are thus identified in each case by the same reference numerals.

Figure 4:
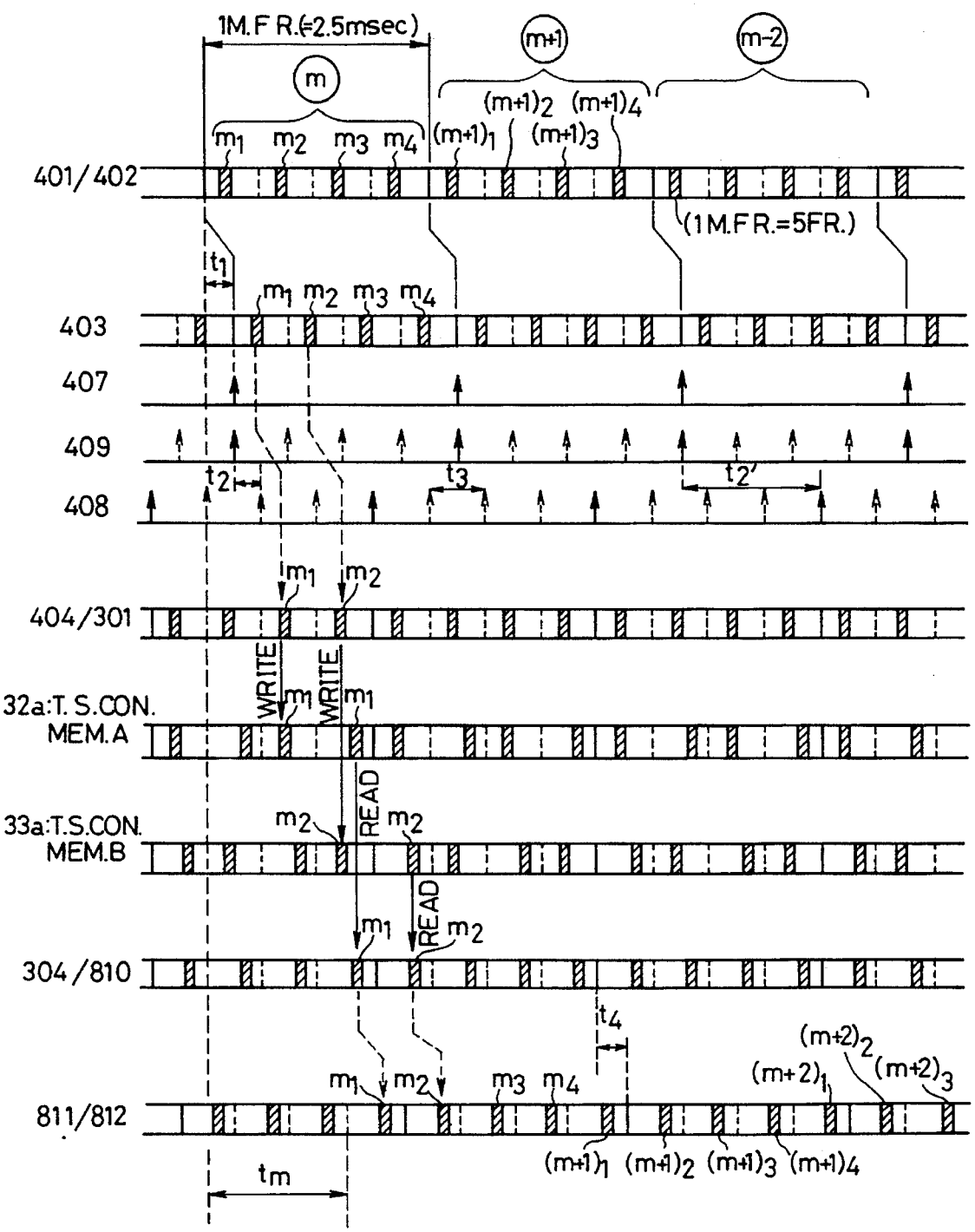
FIG. 4 shows operation timing at the relay node.
Figure 5:
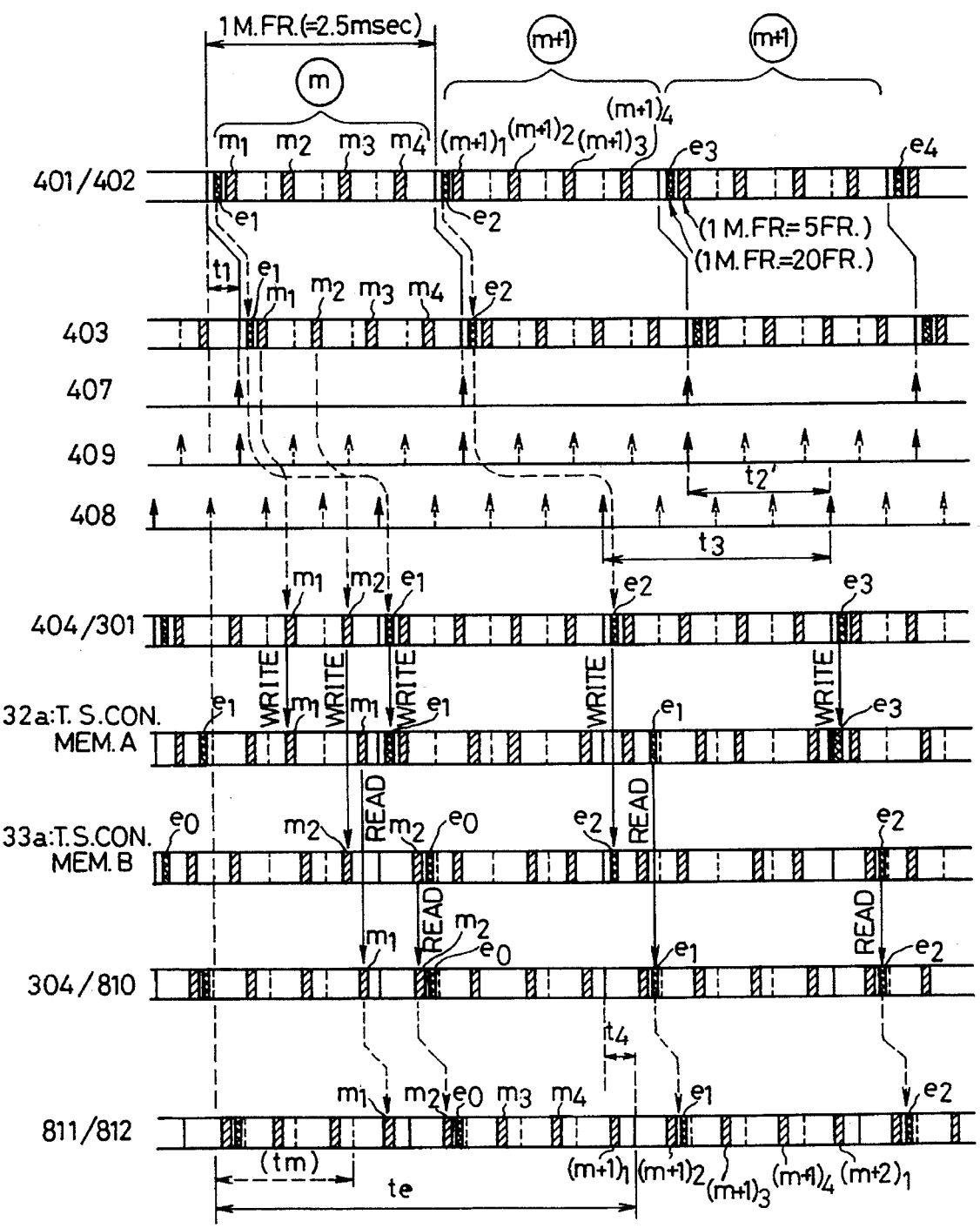
FIG. 5 shows other operation timing at the relay node.

FIGS. 4 and 5 show timings at the relay node in the bit multiplexer of the invention. In FIGS. 4 and 5, the numerals 401, 402, etc., Indicate the signals shown in FIG. 3. When 5 frames are defined as one multi-frame in a channel, the delay "tm" caused by exchanging the data at the relay node is reduced as shown in FIG. 4.

The delay "tm" at the relay node is shown as $tm = t1 + t2 + t3 + t4$. In this formula, each of $t1$ and $t4$ is the delay at the timing-conversion buffer memory, $t2$ is the difference between the multi-frame phase of the receiving data and the internal multi-frame phase of the node (1–20 frames, 1.e., 125 μs–2.5 ms), $t2'$ is the difference between the multi-frame phase of the receiving data and the internal multi-frame phase of the node (1–5 frames, i.e., 125 μs–625 μs) when 5 frames are defined as one multi-frame, and $t3$ is the delay caused by exchanging the data at the TSI, which becomes 5 frames (=625 μsec) when 5 frames are defined as one multi-frame.

FIG. 5 compares the time delay "re", which is the delay at the relay node when 20 frames are defined as one multi-frame in a channel and "tm" described above. The delay at the relay node can be shorter by reducing the number of Frames defined as one multi-frame as shown in FIG. 5.

Figure 23:
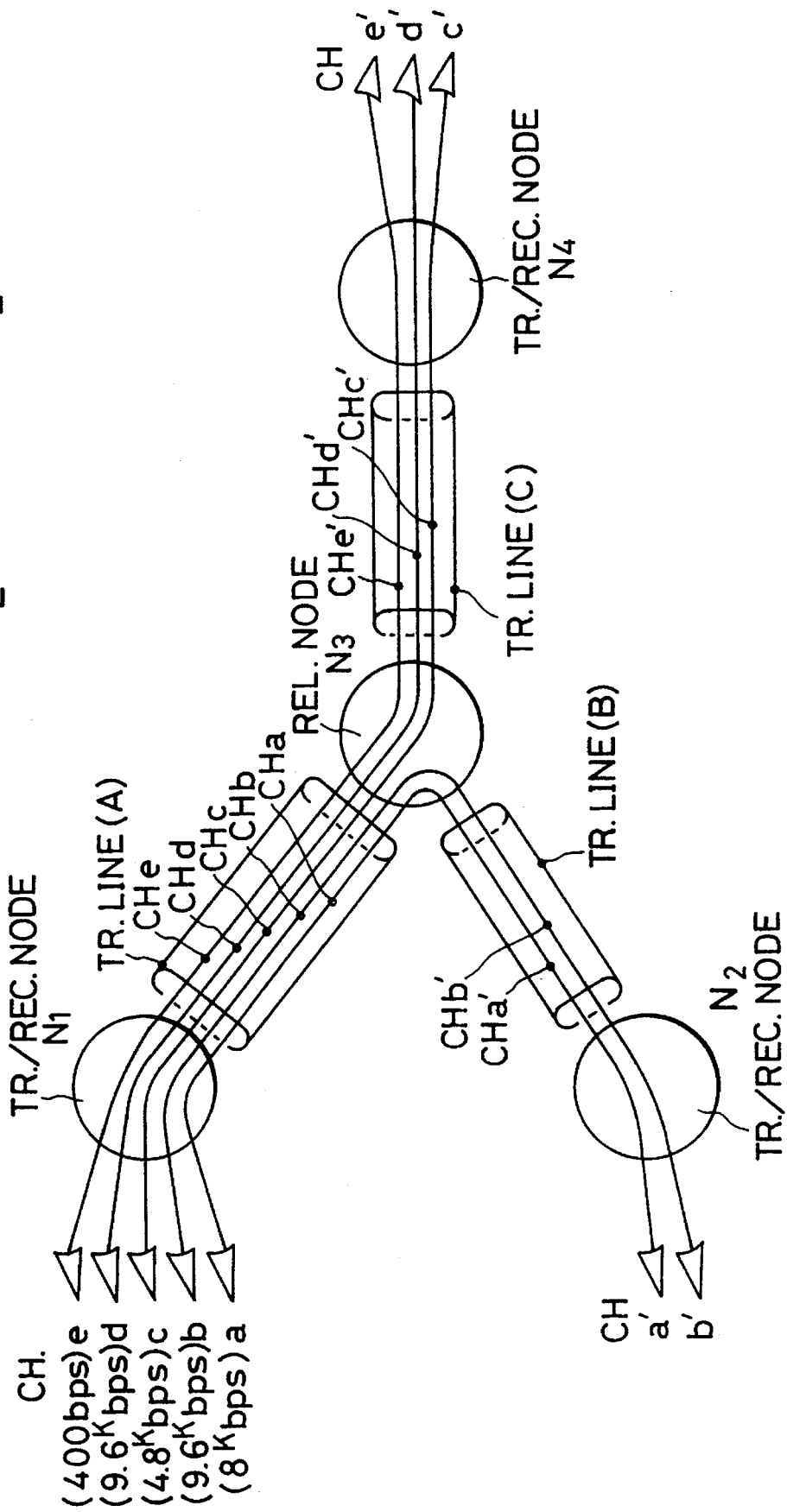
FIG. 23 illustrates an example of a network of channels of the conventional bit multiplexing system.
Figure 24:
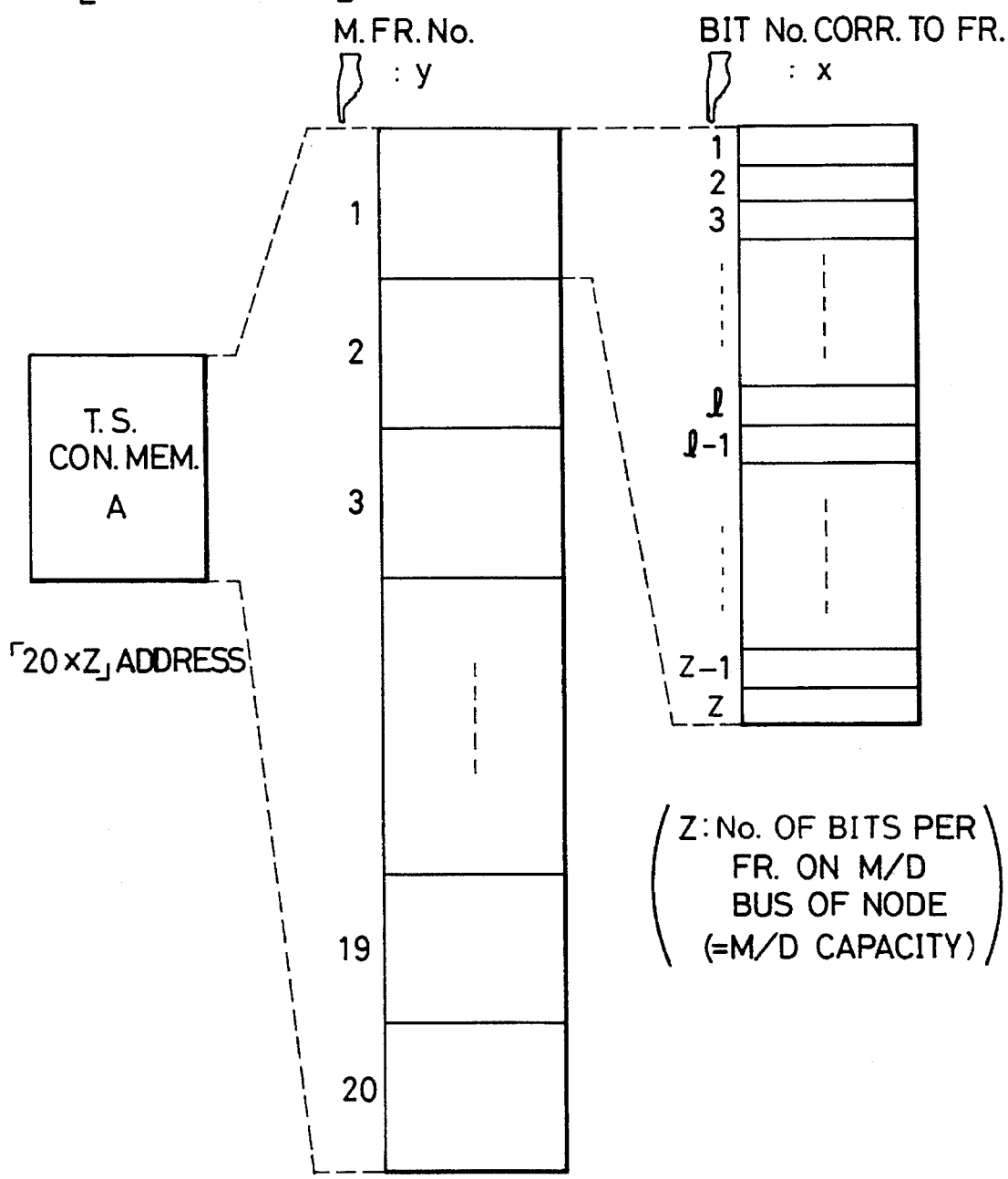
FIG. 24 shows the configuration of a time-slot-conversion memory In TSI of the conventional multiplexer.
Figure 25:
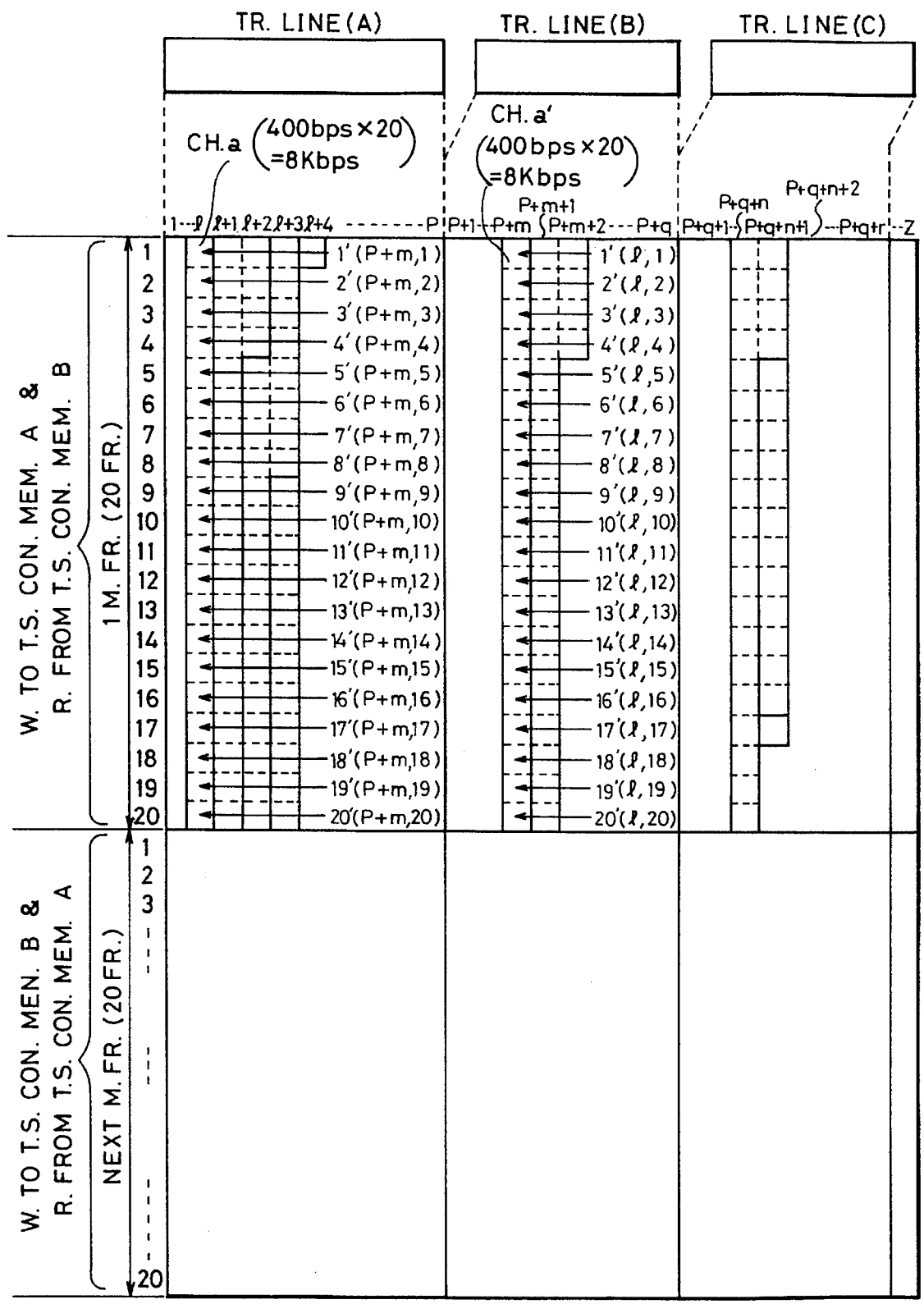
FIG. 25 explains the operation of the TSI at the relay node of the conventional bit multiplexing system.
Figure 26:
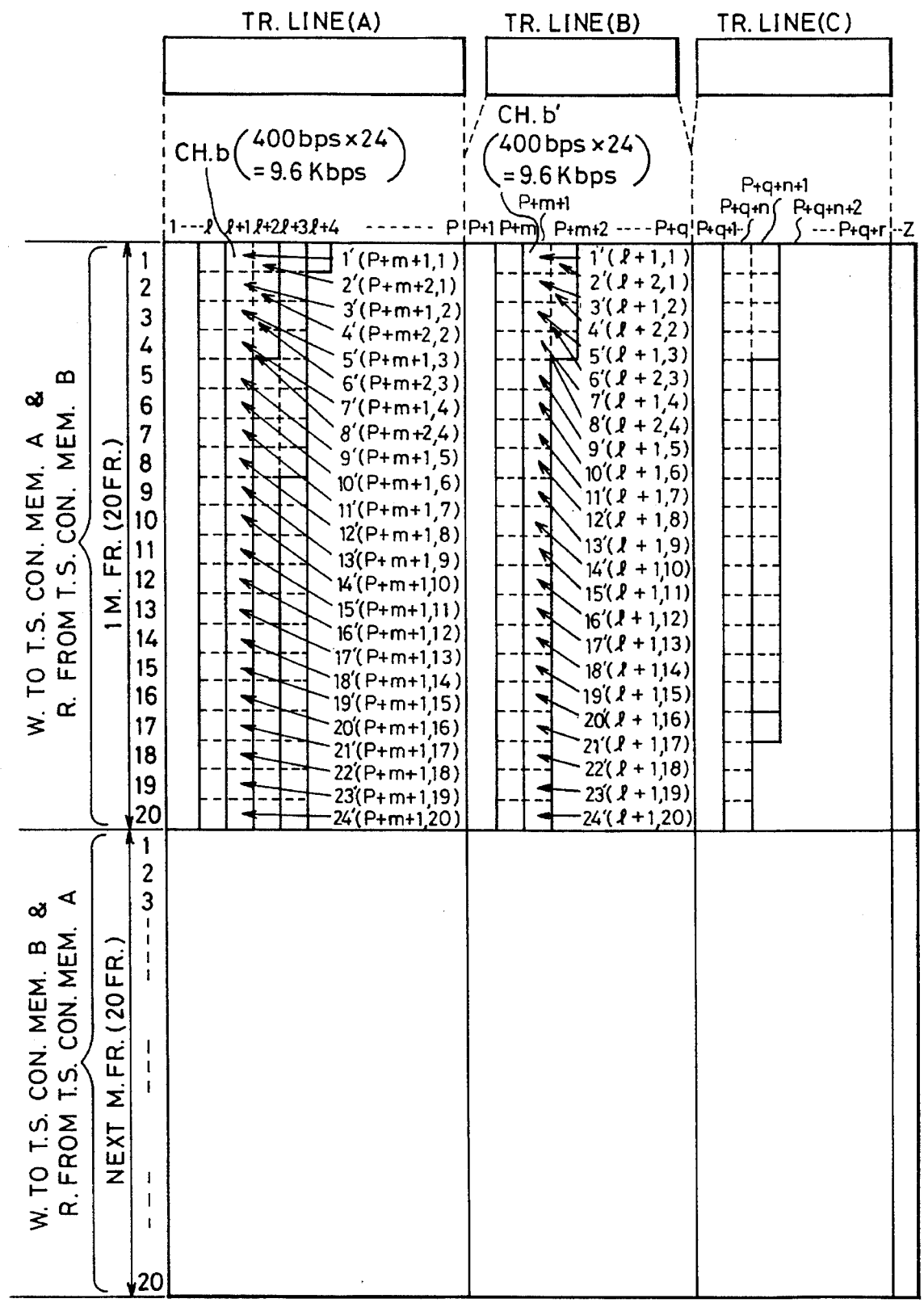
FIG. 26 explains the operation of the TSI at the relay node of the conventional bit multiplexing system.
Figure 27:
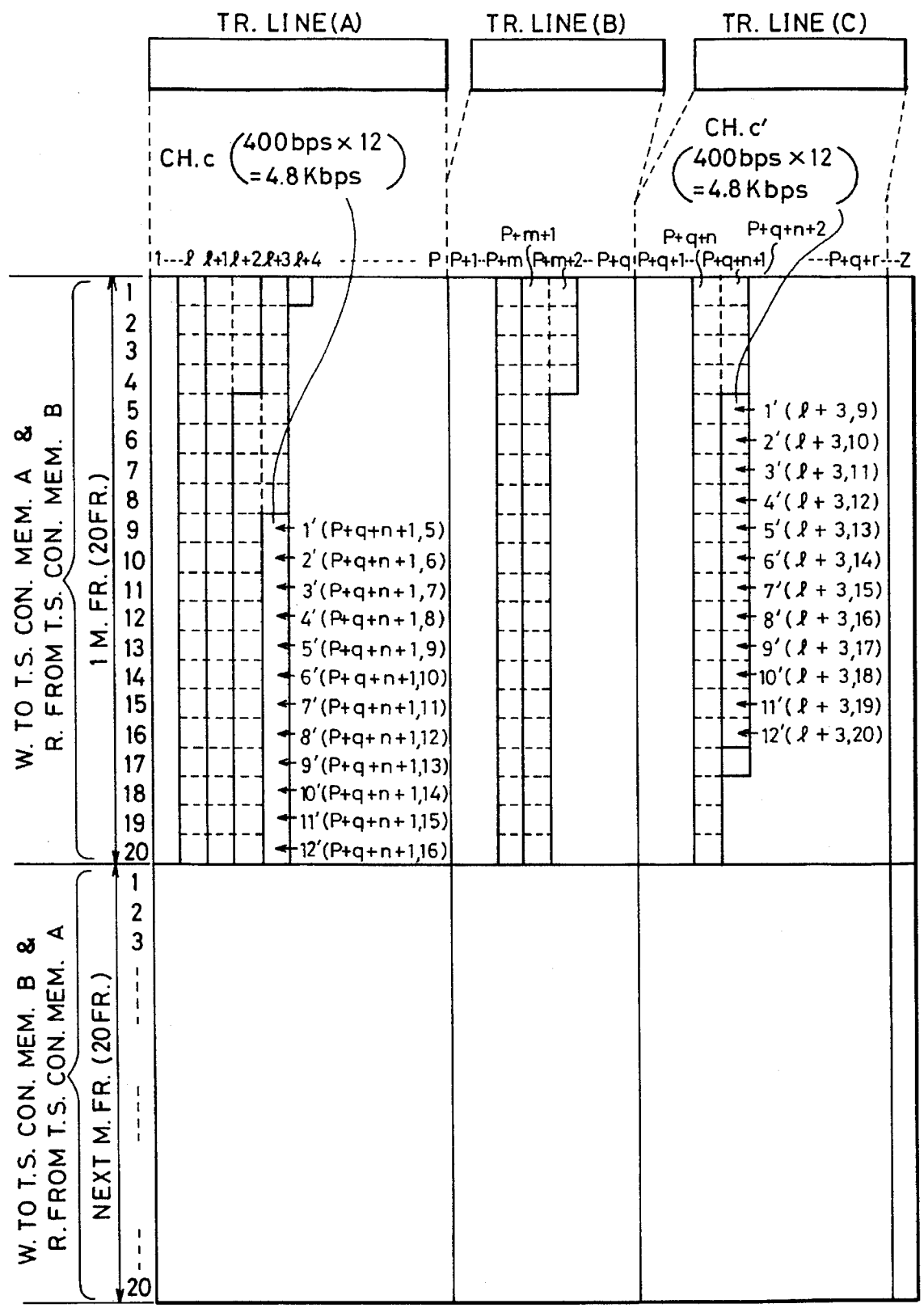
FIG. 27 explains the operation of the TSI at the relay node of the conventional bit multiplexing system.
Figure 28:
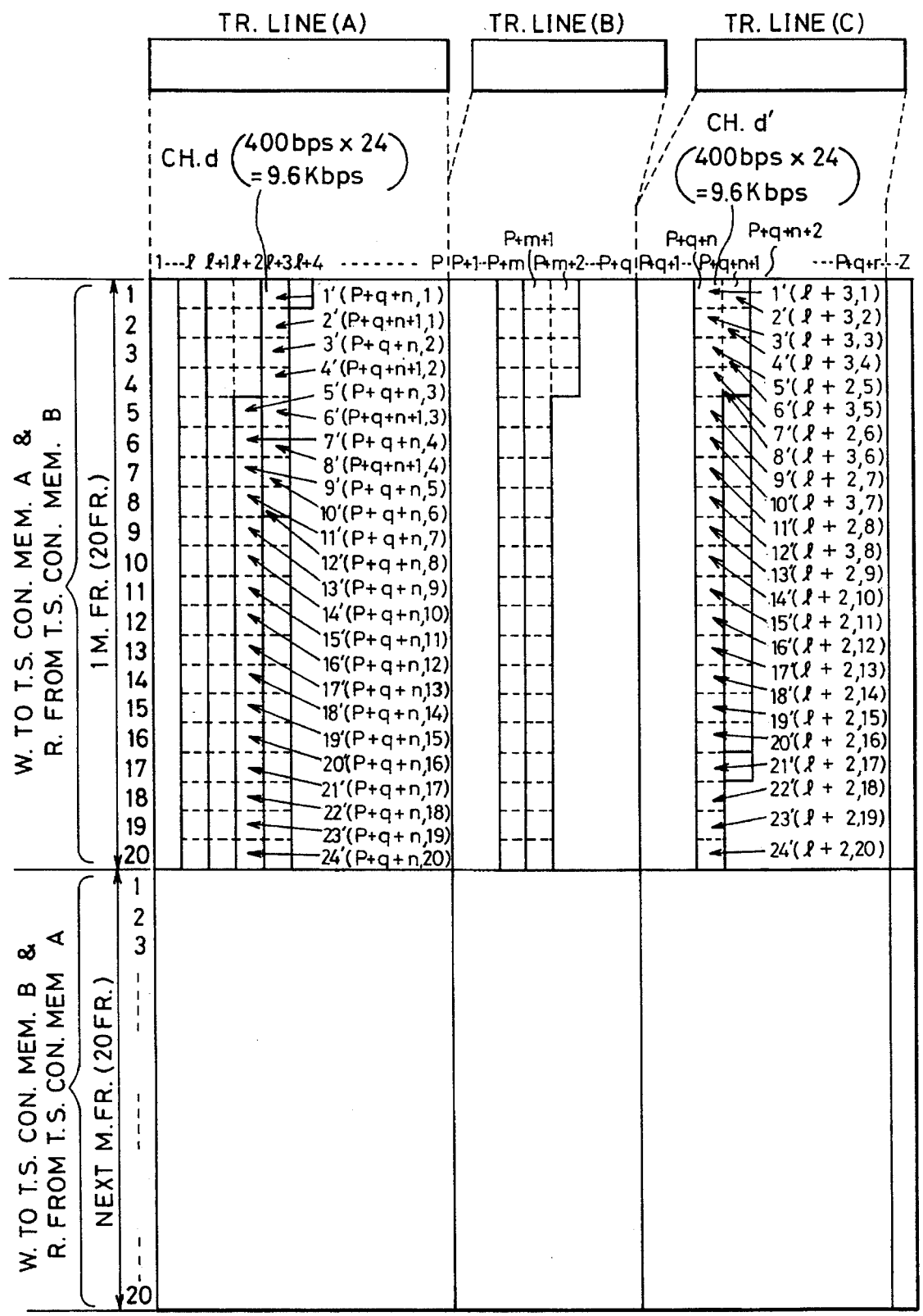
FIG. 28 explains the operation of the TSI at the relay node of the conventional bit multiplexing system.
Figure 29:
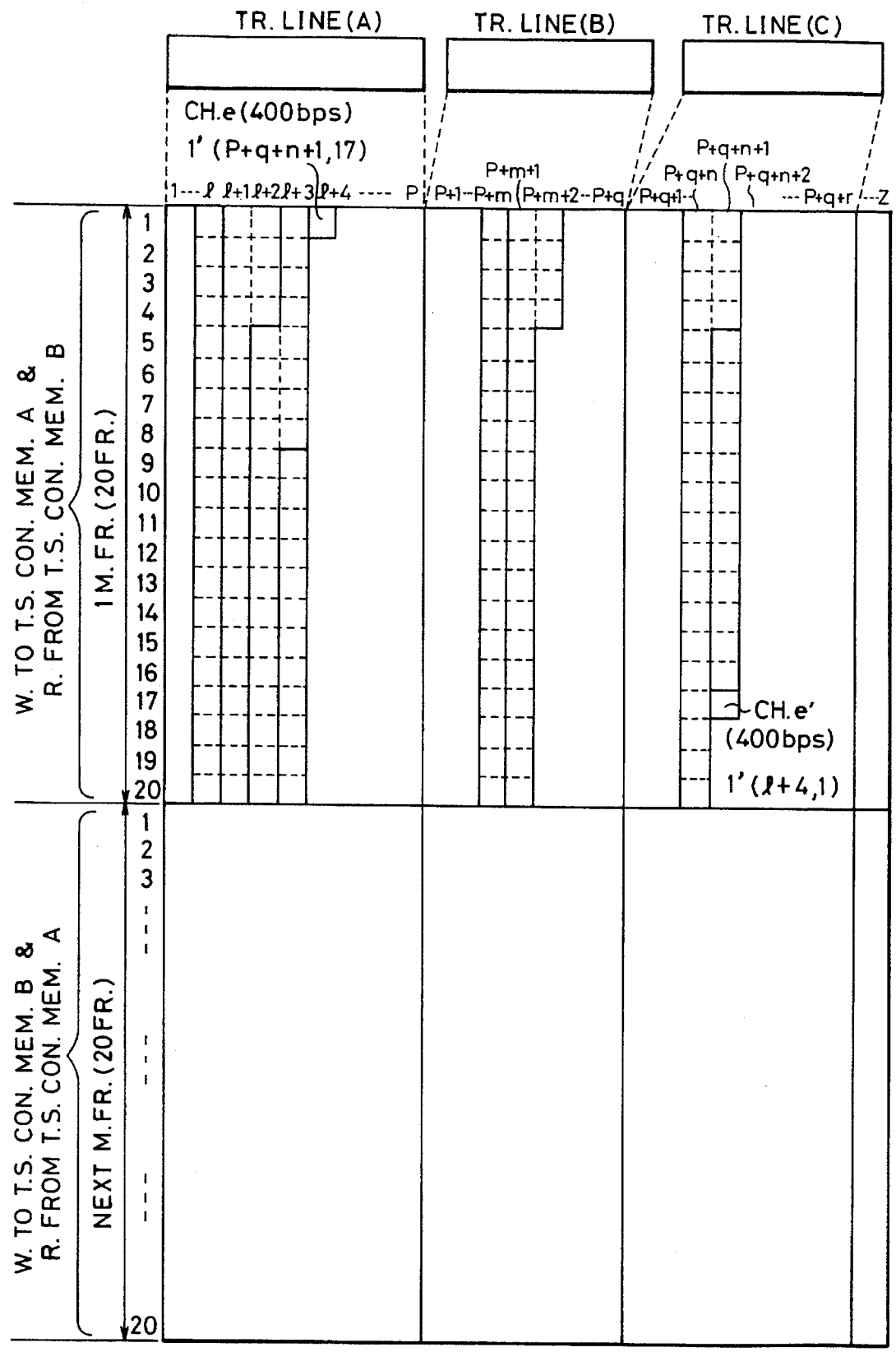
FIG. 29 explains the operation of the TSI at the relay node of the conventional bit multiplexing system.
Figure 30:
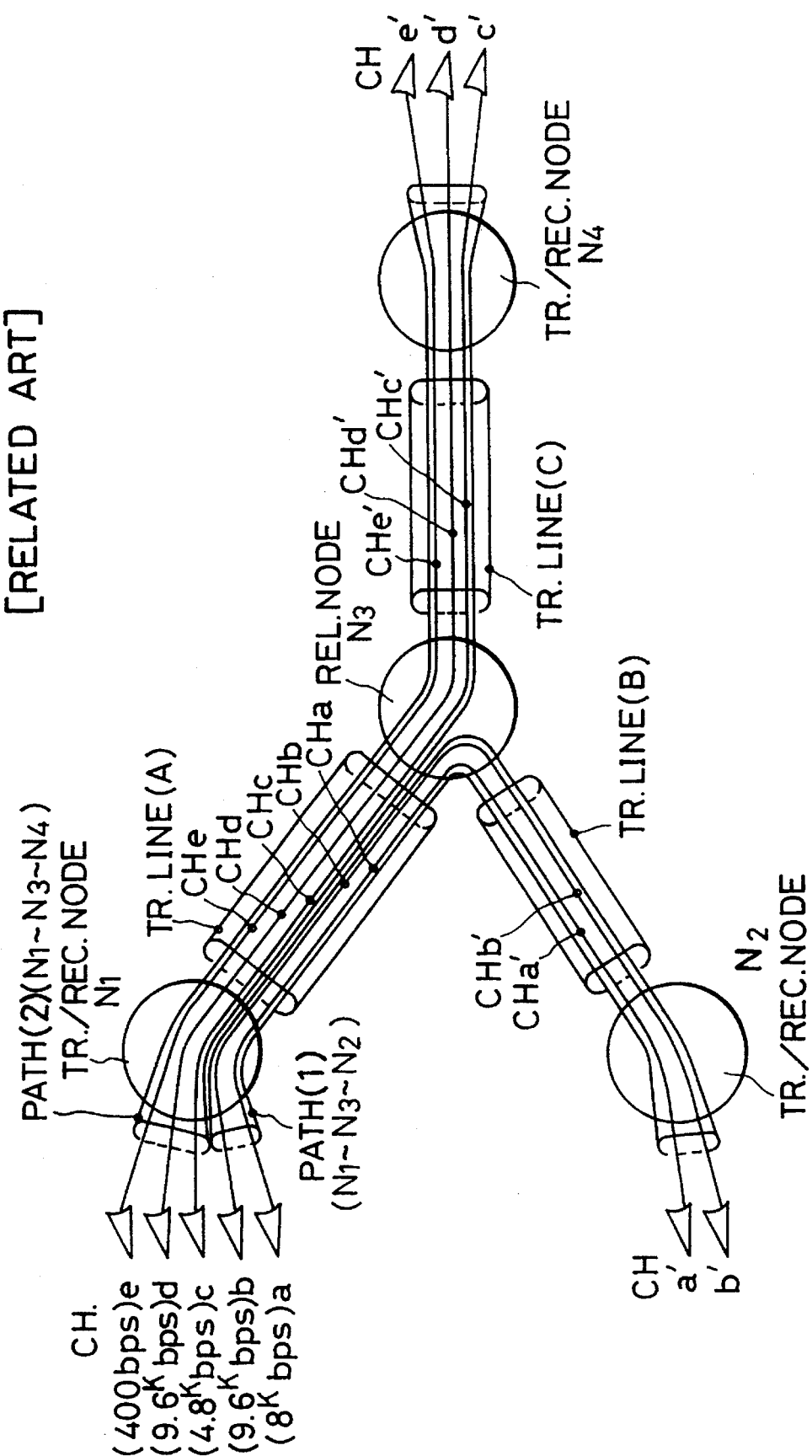
FIG. 30 illustrates a network example of paths and channels according to a conventional bit-octet multiplexing system.
Figure 31:
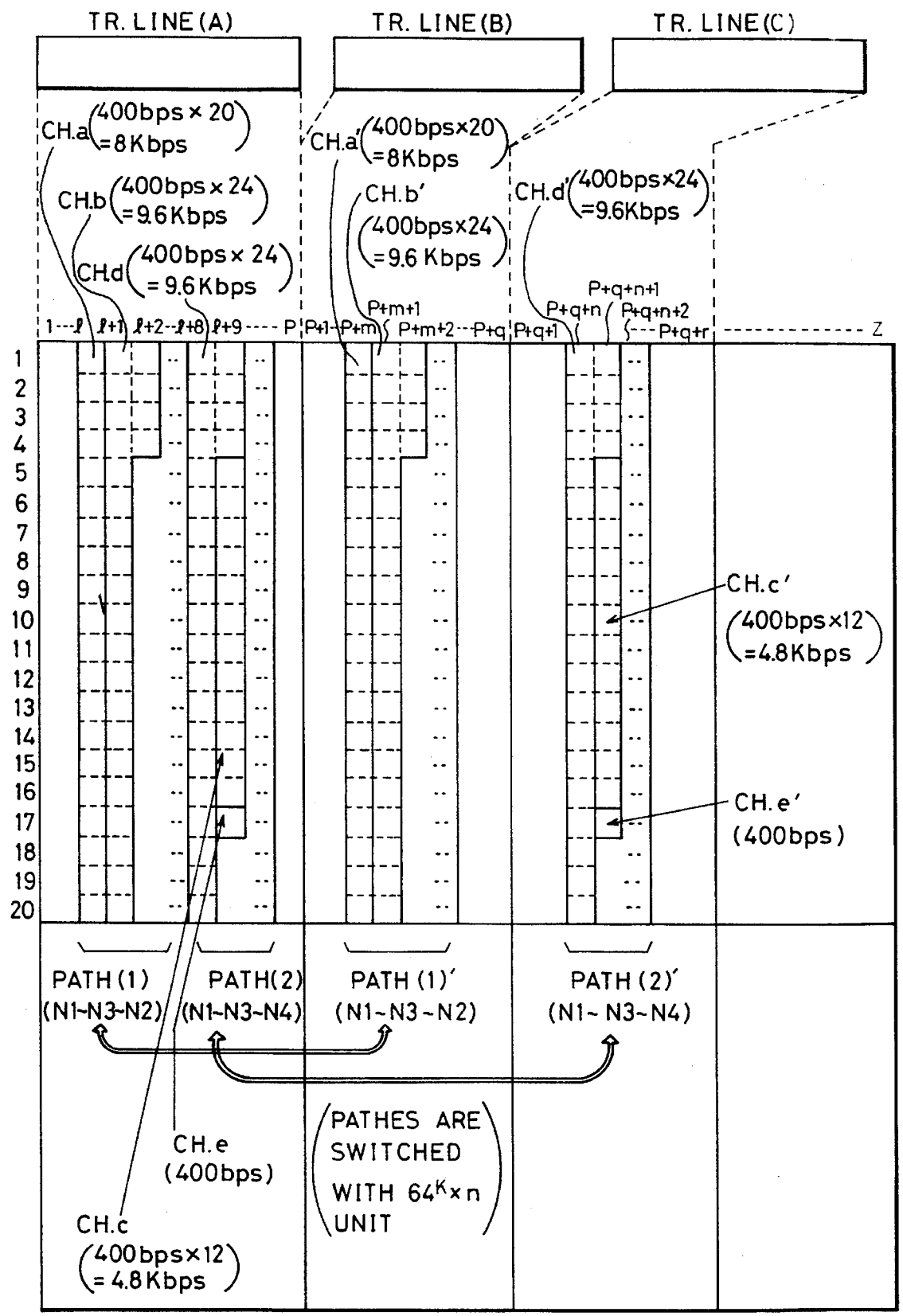
FIG. 31 shows an example of an operation of TSI at a relay node of the conventional bit-octet multiplexing system.

A network of the channels can be the same as illustrated in FIG. 23 of the related art.

Figure 6:
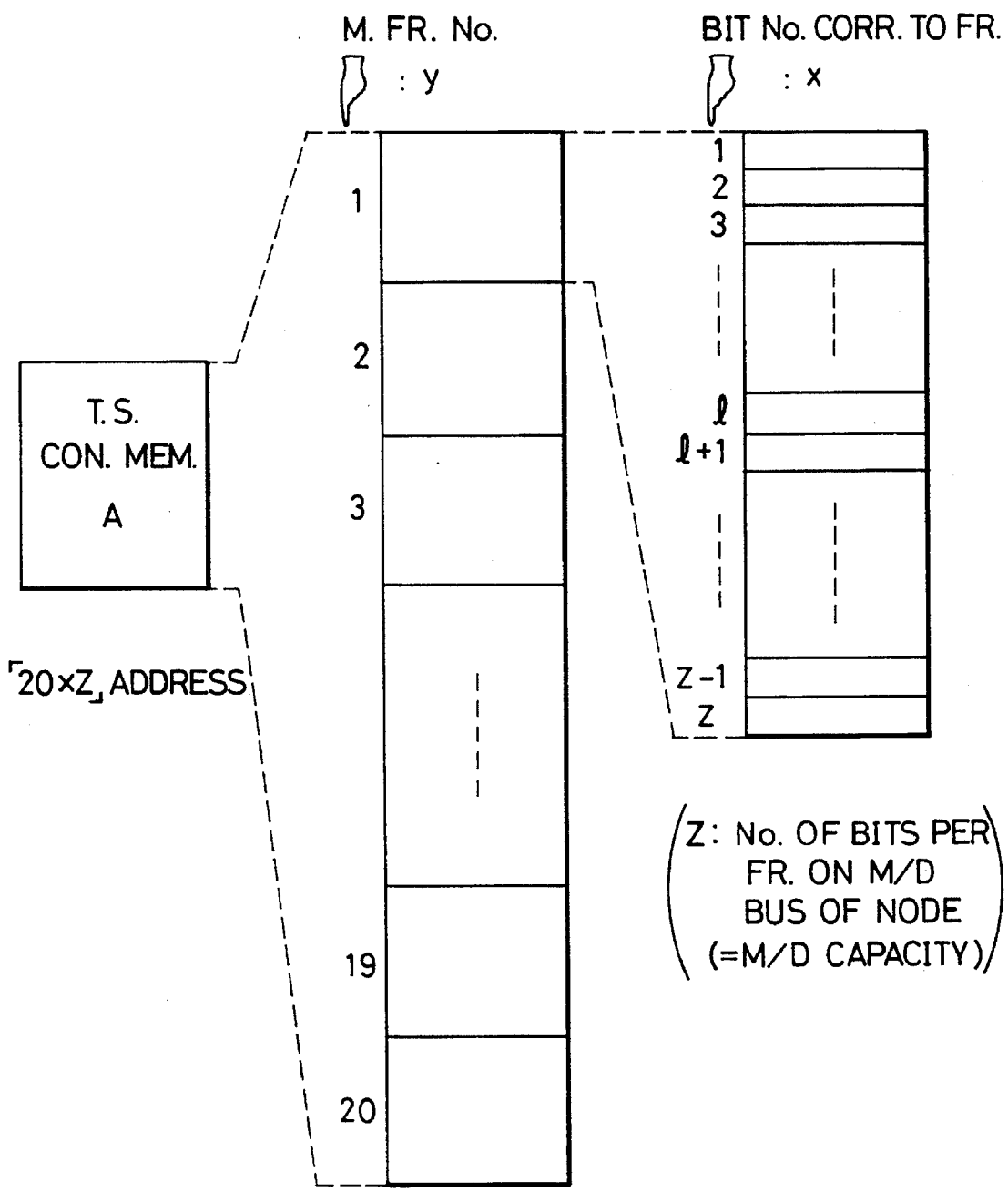
FIG. 6 shows a configuration of a time-slot-conversion memory in TSI.

FIG. 6 shows a configuration of the time-slot-conversion memory A (32a)/B (33a) when the multiplexers of the invention are used at the transmitting/receiving nodes N1, N2, N4 and the relay node N3 shown in FIG. 23. In FIG. 6, Z is the number of bits per frame on the multiplexing/demultiplexing bus at the node. The capacity of the time-slot-conversion memories becomes 2×20×Z=40Z (addresses) including A and B.

In the following explanation, x and y of (x, y) are the bit numbers corresponding to the frame and a multi-frame number, respectively. Thus, (x, y) shows a specific address in the time-slot-conversion memory. For example, (1, 19) shows the first memory of the nineteenth frame.

FIGS. 7–11 show examples of the operation of the TSI at the relay node of the bit multiplexing system of the invention, which correspond to FIGS. 25–29 showing the operation of the conventional system, respectively.

Figure 7:
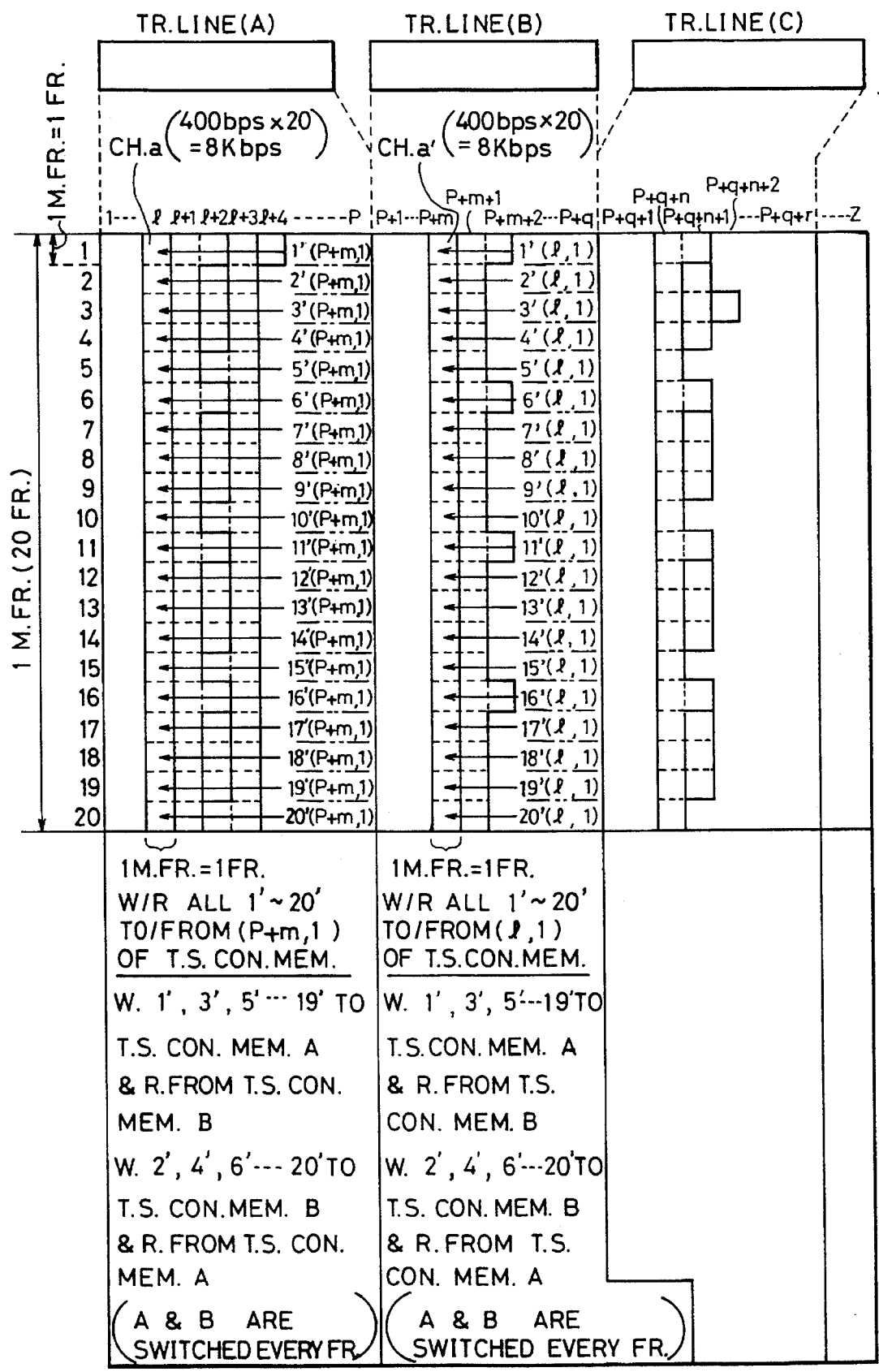
FIG. 7 illustrates the operation of the TSI at the relay node.

FIG. 7 shows a frame-assignment to "channel a and a'" in the transmission lines (A) and (B) (from "terminal a" at N1 to "terminal a'" at N2 through N3). The same assignment is given for transmitting/receiving the data in the time-slot-conversion memory in the TSI 3a at N3.

In FIG. 7, being different from FIGS. 4 and 5, one frame is defined as one multi-frame format and the data in "channel a and a'" is exchanged at N3.

FIG. 7, 1' (p+m, 1) indicates data 1' is written in/read from an address (p+m, 1) in the time-slot-conversion memory. The direction of writing/reading the data to/from the time-slot-conversion memories A and B in the TSI 3a is reversed every frame for writing/reading the data to/from the channels a and a'.

Figure 8:
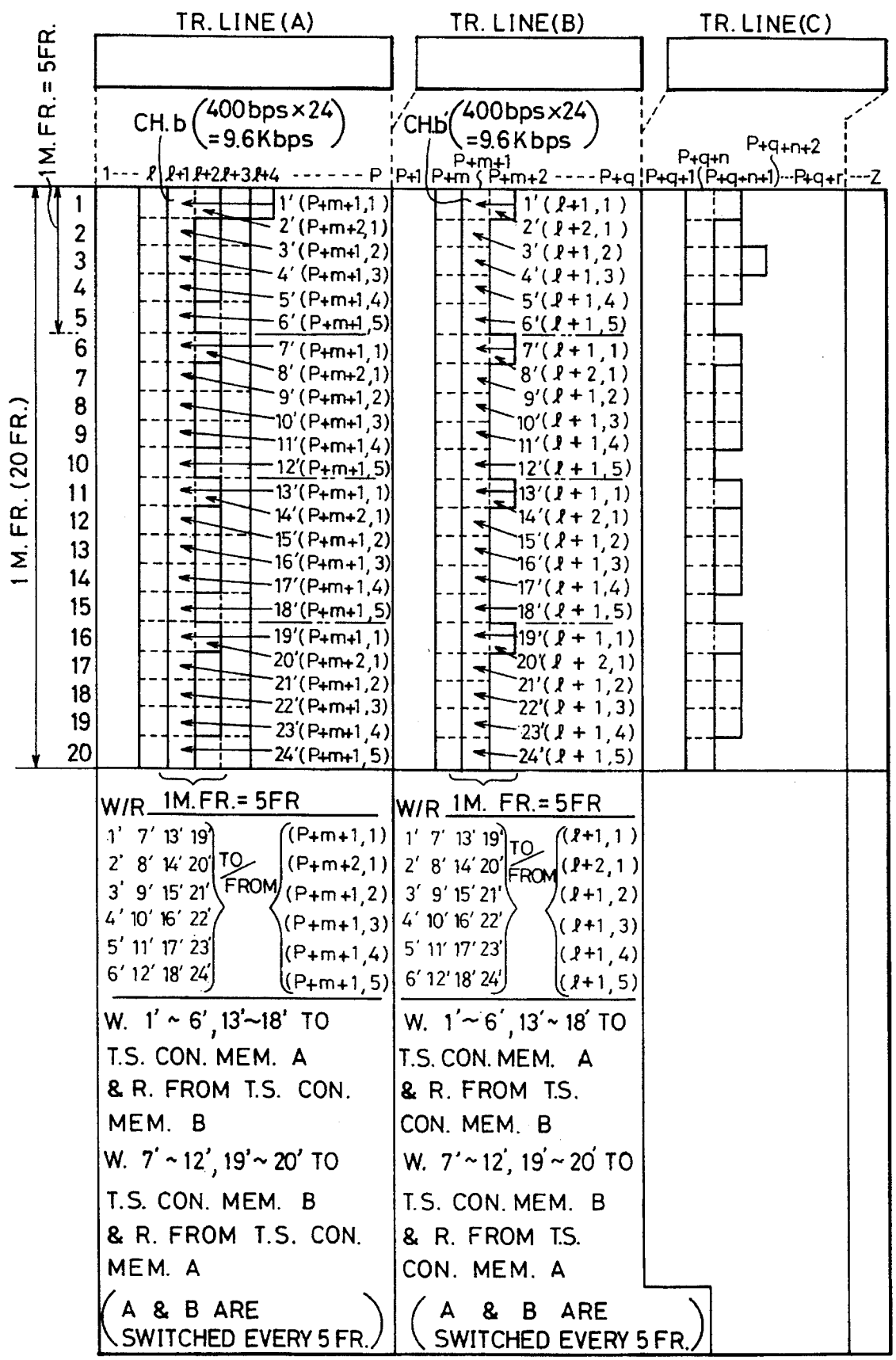
FIG. 8 further Illustrates the operation of the TSI at the relay node.

FIG. 8 shows a frame-assignment to "channel b and b'" in the transmission lines (A), (B) and in the time-slot conversion memories 32a, 33a in the TSI 3a. The direction of writing/reading the data to/from the time-slot-conversion memories 32a and 33a is reversed every 5 frames for writing/reading the data to/from the channels b and b'.

Figure 9:
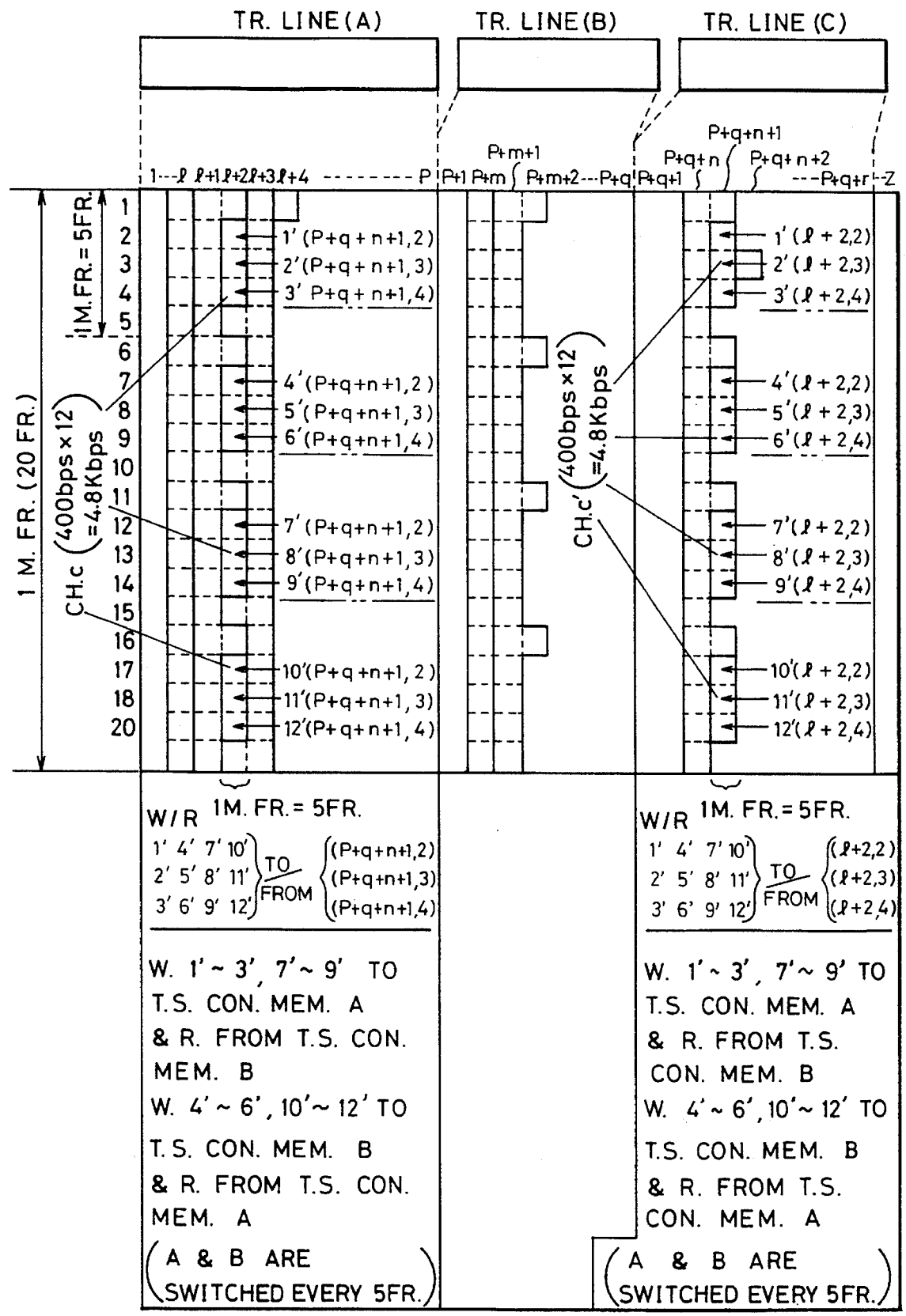
FIG. 9 further illustrates the operation of the TSI at the relay node.

FIG. 9 shows frame-assignment to "channel c and c'" in the transmission lines (A), (B) and in the time-slot conversion memories 32a, 33a in the TSI 3a. The direction of writing/reading the data to/from the time-slot-conversion memories 32a and 33a is reversed every 5 frames for writing/reading the data to/from the channels c and c'.

Figure 10:
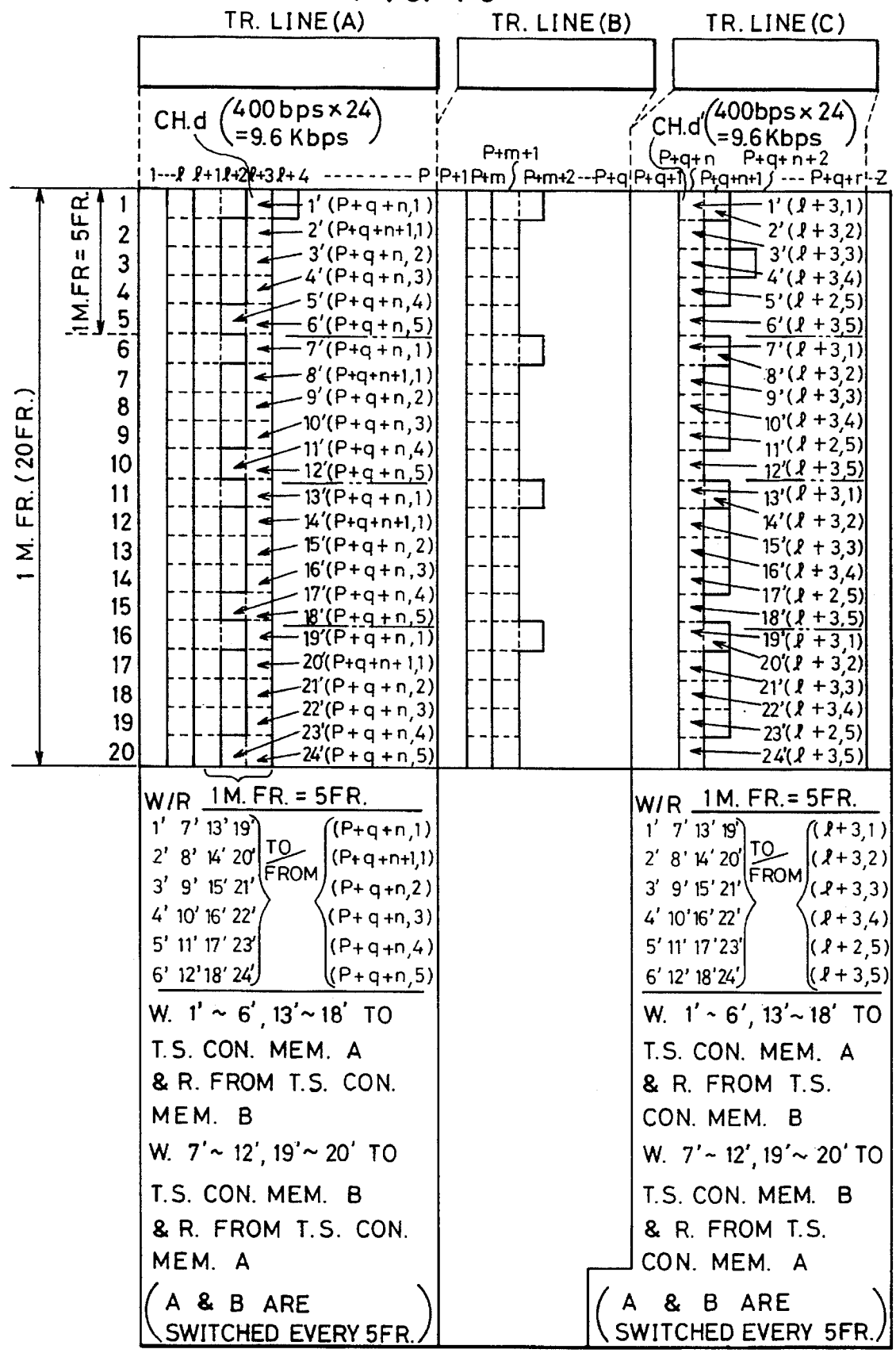
FIG. 10 further illustrates the operation of the TSI at the relay node.

FIG. 10 shows frame-assignment to "channel d and d'" in the transmission lines (A), (B) and in the time-slot conversion memories 32a, 33a in the TSI 3a. In FIG. 10, being different from FIGS. 4 and 5. 20 frames are defined as one multi-frame format and the data in "channel e and c'" is exchanged at N3. The direction of writing/reading the data to/from the time-slot-conversion memories 32a and 33a is reversed every 5 frames for writing/reading the data to/from the channels d and d'.

Figure 11:
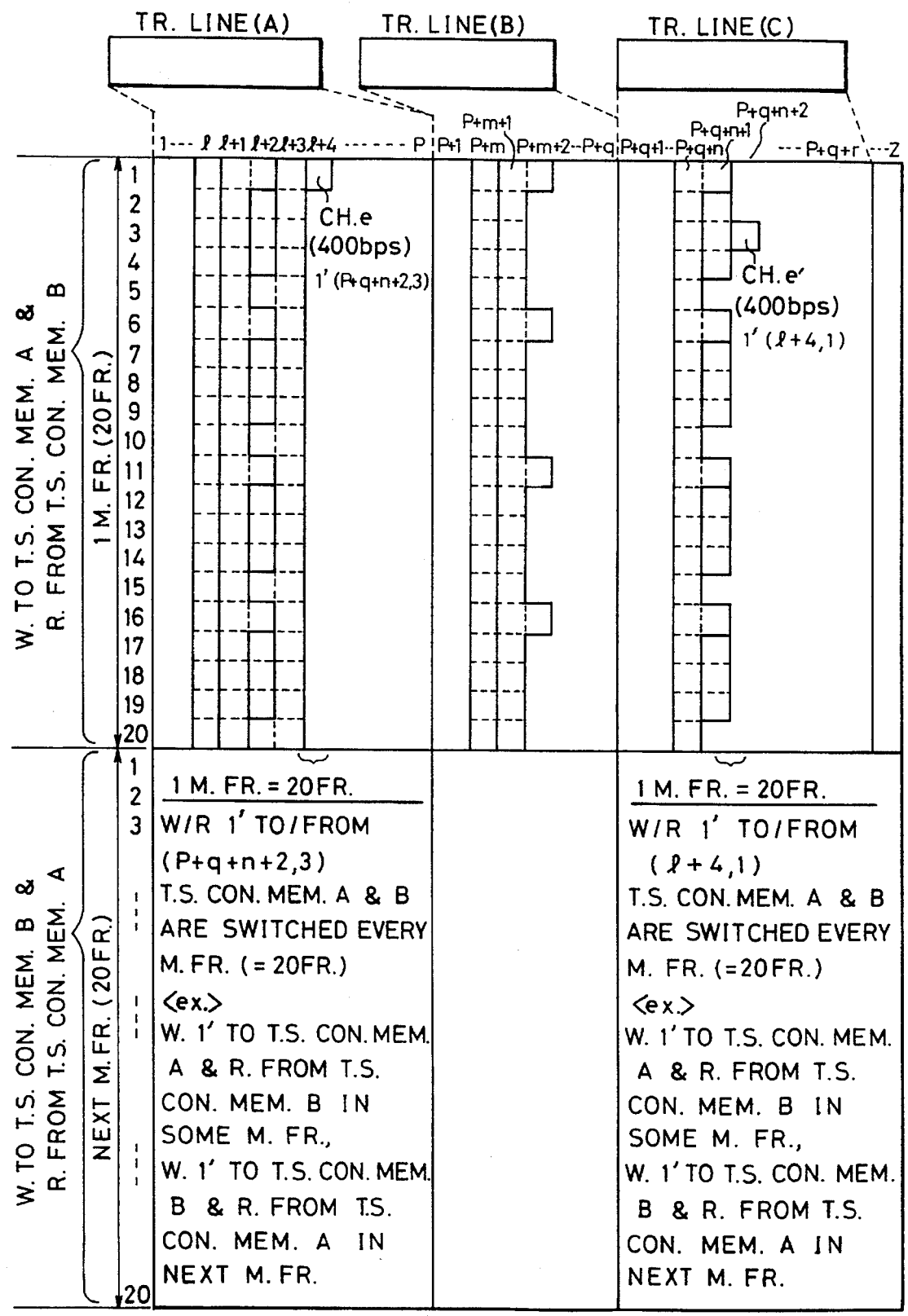
FIG. 11 further illustrates the operation of the TSI at the relay node.

FIG. 11 shows a frame-assignment to "channel e and e'" in the transmission lines (A), (B) and in the time-slot conversion memories 32a, 33a in the TSI 3a. The direction of writing/reading the data to/from the time-slot-conversion memories 32a and 33a is reversed every 20 frames for writing/reading the data to/from the channels e and e'.

Figure 12:
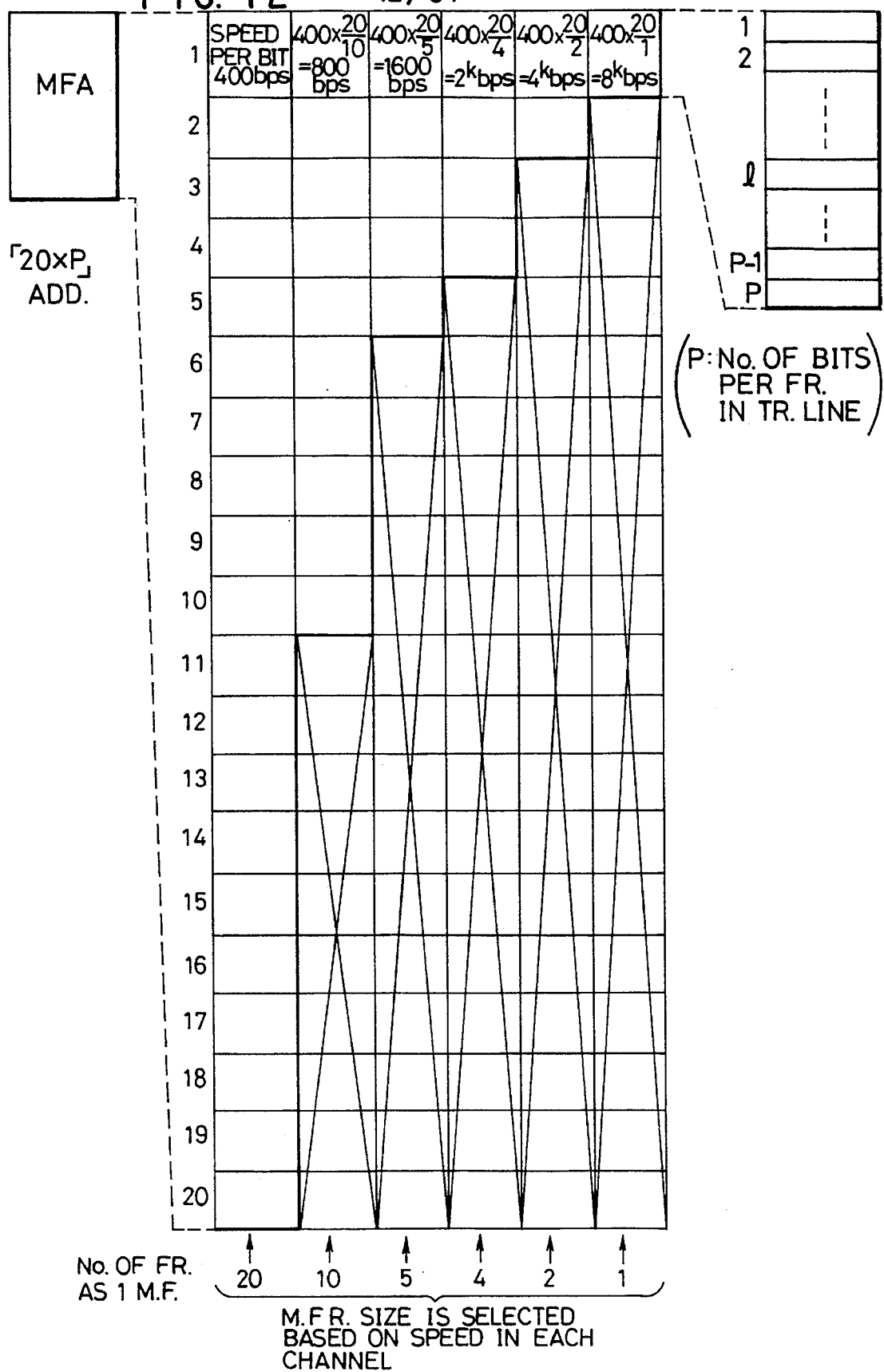
FIG. 12 shows a configuration of a multi-frame alignment memory in a transmission Interface.

FIG. 12 shows the configuration of the multi-frame alignment memory in the transmission interface of the invention.

The data is written to/read from each channel with a multi-frame format, the size of which is specified based on the transmission speed of the data in each channel. Therefore, when the multi-frame size is less than 20 frames, the data can be transmitted/received with reducing delay (of data exchange) between the timing of the received multi-frame in the transmission line and the timing of the multi-frame in the node.

Multiplexing the data at the transmitting node by bit multiplexing will be explained in relation to these figures. First, the multiplexing system of the data from the terminal to the transmission line will be explained and compared with the conventional multiplexing system. As shown in FIG. 2, the terminal data 201, which was received through the terminal interface 2, is written in the timing-conversion buffer memory 22 as the signal 202 by the terminal clock pulse (204/205). The data is output to the multiplexing/demultiplexing bus 5 for received data as the signal 203 by the read-timing pulse from the timing bus 7, then is written in the time-slot-conversion memory 32a/33a in the TSI 3a as the signal 302/303 by the timing pulse 305/306/307.

The data is transmitted to the multiplexing/demultiplexing bus 6 for transmitting data as the signal 304 by the timing pulse 305/306/307 and is written in the timing-conversion buffer memory 47 in a transmission Interface 4a as the signal 410 by the write-timing pulse 413. The data is thus read as the signal 411 by the clock pulse 415 and output to the transmission line as the signal 412.

Demultiplexing the data from the transmission line to the terminal will be explained below.

The transmission line data 401, which is received through the transmission interface 4a, is written in the timing-conversion buffer memory 43 as the signal 402 by the transmission line clock pulse 405. The data is read as the signal 403 by the read-timing pulse 406, and the multi-frame synchronizing bit is detected. The multi-frame phase signal 407 is transmitted to a write-timing pulse generator 49. The data 403 is written in the MFA 45a by the multi-frame timing pulse 409, which is changeable according to the number of frames defined as one multi-frame for the transmission speed of the data in each channel. The data is thus transmitted to the multiplexing/demultiplexing bus 5 for received data as the signal 404 by the read-timing pulse 408, which is changeable according to the transmission speed of the data in each channel, and written in the time-slot-conversion memory 32a/33a as the signal 302/303 through the selector 31 in the TSI 3a by the timing pulse 305/306/307, which is changeable according to the transmission speed of the data in each channel.

The written data is read and transmitted to the multiplexing/demultiplexing bus 6 for transmitting data as the signal 304 by the timing pulse 305/306/307, which is changeable according to the transmission speed of the data in each channel, and written in the timing-conversion buffer memory 24 in the terminal interface 2 as the signal 207 by the write-timing pulse 210, which is changeable according to the transmission speed of the data in each channel. The data is thus read as the signal 208 by the terminal clock pulse 212 to transmit to the terminal as the signal 209.

A PG 1a outputs various kinds of timing pulses similarly to the PG 1 of the conventional system. A simultaneous timing generator 12a in the PG 1a, however, generates more kinds of timing pulses than the timing generator 12 of the conventional system, so that the data can be transmitted to/received from the multiplexing/demultiplexing bus 5/6 with a multi-frame unit, in which the number of frames is predetermined, in each channel.

As described above, the multiplexing/demultiplexing of the data between the terminal and the transmission line is similar to the conventional system. An aspect different from the conventional system is timing pulses, which will be described below. The MFA 45 of the conventional system has to absorb difference of timing between the timing of the received multi-frame in the transmission line and the timing of the multi-frame in the node (the read timing from the timing bus). The maximum delay of one multi-frame period (when one multi-frame consists of 20 frames, 2.5 msec at maximum (125 μsec ×20)) may occur in the conventional bit multiplexing system.

In the bit multiplexing system of the invention, the number of Frames defined as one multi-frame can be specified according to the transmission speed of the data in each channel. Thus, the delay can be reduced, for example, to 625 μsec (125 μsec×5) at a maximum when one multi-frame consists of 5 frames in the channel, in which the data is transmitted at the speed of 9.6 kbps as shown as t2 in FIG. 4.

Generally, when one multi-frame consists of n frames, n is specified according to the transmission speed of the data in each channel, the delay is reduced to n/20 compared with the case when one multi-frame is fixed to have 20 frames. FIG. 12 shows a configuration of the MFA 45a shown in FIG. 2 when the MFA 45a has different multi-frame size of n frames, and n=1, 2, 4, 5, 10, 20 (common measures of 20).

The delay caused by absorbing the difference of timing between the write timing and the read timing in the time-slot-conversion memory 32a/33a in the TSI 3a is similar to the conventional bit multiplexing system. With a smaller number of frames for reading/writing the data, the delay is reduced as described above.

When the data is transmitted to the transmission line, the delay caused by absorbing the difference of the timing between the write timing and the read timing from the timing bus 7 is the same as the conventional bit multiplexing system.

Multiplexing/demultiplexing of the data from the transmission line (A) to the transmission line (B) at the relay node will be explained below with reference to FIG. 3. The transmission line data 801, which is received through the transmission interface 8a, is written in the timing-conversion buffer memory 83 as the signal 802 by the transmission line clock pulse 805. The data is read as the signal 803 by the read-timing pulse 806 and the multi-frame synchronizing bit is detected. The received multi-frame phase signal 807 is transmitted to a write-timing pulse generator 89. The received data is written in the MFA 85a by a multi-frame timing pulse 809, which is changeable according to the number of Frames defined as one multi-frame for the transmission speed of the data in each channel based on the prefixed assignment information. The received data is output to the multiplexing/demultiplexing bus 5 for received data as the signal 804 by the read-timing pulse 808 and written in the time-slot conversion memory 32a/33a in the TSI 3a as the signal 302/303 by the timing pulse 305/306/307.

The written data is transmitted to the multiplexing/demultiplexing bus 6 for transmitting data as the signal 304 by the timing pulse 305/306/307 and written in the timing-conversion buffer memory 47 in the transmission interface 4a as the signal 410 by the write-timing pulse 413. The data is read as the signal 411 by the transmission clock pulse 415 and transmitted to the transmission line as the signal 412. Multiplexing/demultiplexing of the data from the transmission line (B) to the transmission line (A) is performed in the same way.

The PG 1a outputs various kinds of timing pulses generated by the simultaneous timing generator 12a similarly to the PG 1 in the conventional system. As a different aspect from the conventional system, the timing, which is changeable according to the number of Frames defined as one multi-frame for the transmission speed of the data, is output for writing/reading the data to/from the interface and the memory in the TSI with a multi-frame unit, in which the number of Frames is specified in each channel (1–20 frames).

The MFA 45a has to absorb the difference of the timing between the timing of the received multi-frame in the transmission line (B) and the timing of the multi-frame in the node (the read timing From the timing bus) For the received data from the transmission line (A). By the conventional multiplexing system, the delay of one multi-frame period occurs at a maximum.

By the bit multiplexing system according to the invention, the delay t2 may be reduced to n/20 at maximum, for example, 625 μsec when n=5 frames defined as one multi-frame for transmitting data at the speed of 9.6 kbps in the channel as shown in FIG. 4. Thus, the delay can be reduced to n/20 at maximum to both the transmitting/receiving node and the relay node as shown in FIG. 12.

In the conventional bit multiplexing system, the exchanging delay of the time-slot-conversion memory 32/33 in the TSI 3 is typically 2.5 msec (125 μsec×20) because the data is exchanged with a fixed multi-frame unit (20 Frames). In the bit multiplexing system of the invention, the number of the frames defined as one multi-frame is changeable and is specified according to the transmission speed of data in each channel. The exchanging delay of the time-slot-conversion memory 32a/33a in the TSI 3a can therefore be reduced. For example, the delay t3 can be reduced to 625 μsec (125 μsec ×5) when 5 frames are defined as one multi-frame for transmitting data at the speed of 9.6 kbps.

In another conventional bit-octet multiplexing system, the data is exchanged not with a channel unit, but with an octet unit, so that the exchanging delay In the time-slot-conversion memory 32/33 in the TSI 3 becomes one frame (125 μsec).

In the following, the delay which occurs in the conventional bit multiplexing system, the conventional bit-octet multiplexing system, and the bit multiplexing system of the invention are compared. The explanation is divided into two parts based on two main causes of the delay.

(1) The delay caused by absorbing the difference of the timing between the timing of the received multi-frame in the transmission line and the timing of the multi-frame in the node for the received data from the transmission line becomes one multi-frame period at maximum or one frame period at minimum by both the conventional bit multiplexing system and the conventional bit-octet multiplexing system. For example, when one multi-frame consists of 20 frames, 2.5 msec (125 μsec×20) at maximum and 125 μsec (one frame) at minimum.

In the bit multiplexing system of the invention, when one multi-frame consists of n frames (n can be specified according to the transmission speed of the data in each channel), the delay may become n×125 μsec at maximum.

(2) In the conventional bit multiplexing system, the data is exchanged with a multi-frame unit and the delay caused by exchanging the data in the TSI becomes one multi-frame period, for example, 2.5 msec (125 μsec×20) when one multi-frame consists of 20 frames.

In the conventional bit-octet multiplexing system, the exchanging delay becomes one frame period (125 μsec).

In the bit multiplexing system of the invention, the exchanging delay becomes n×125 μsec when one multi-frame consists of n frames (n is specified according to the transmission speed of the data in each channel).

The above described delays (1), (2) and the delay at the timing-conversion buffer memories (for transmitting and receiving the data) amount to the delays at the relay node in total by each multiplexing system. The delay at the timing-conversion buffer memories is the same by any system, 250 μsec at maximum including two buffer memories, i.e., for transmitting and receiving the data, and the delay will be ignored in the following formula.

(20+20)×125 μsec>=the delay in the conventional bit multiplexing system >=(1+20)×125 μsec (20+1)×125 μsec >=the delay in the conventional bit-octet multiplexing system >=(1+1)×125 μsec (n+n)×125 μsec >=the delay in the bit multiplexing system of the invention >=(1+n)×125 μsec In the above formula, n is specified according to the transmission speed of the data in each channel and becomes n=1, 2, 4, 5, 10, 20.

Figure 13:
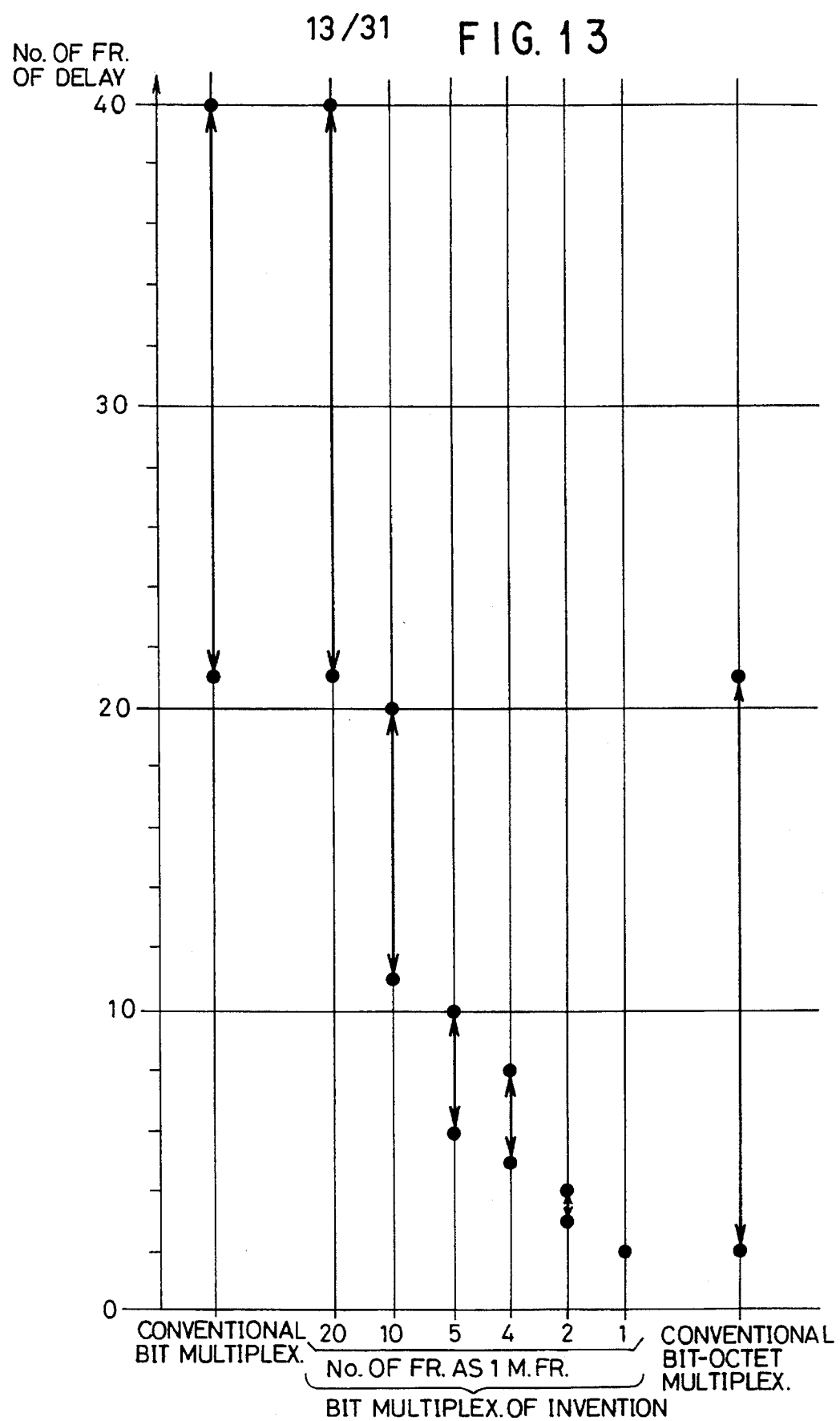
FIG. 13 shows a comparison of the lengths of delays at the relay node according to three systems.

FIG. 13 shows these lengths of the delays in three different systems. As shown in the figure, the delay in the bit multiplexing system of the Invention is in the middle between the conventional bit-octet multiplexing system and the conventional bit multiplexing system. The length of the delay at the relay node is dispersed. However, if the number of the relay node increases, the dispersion can be averaged. The delay at the relay node in the bit multiplexing system of the invention can be considered to be less than the delay in the conventional bit-octet multiplexing system when n <=5.

Embodiment 2

Figure 14:
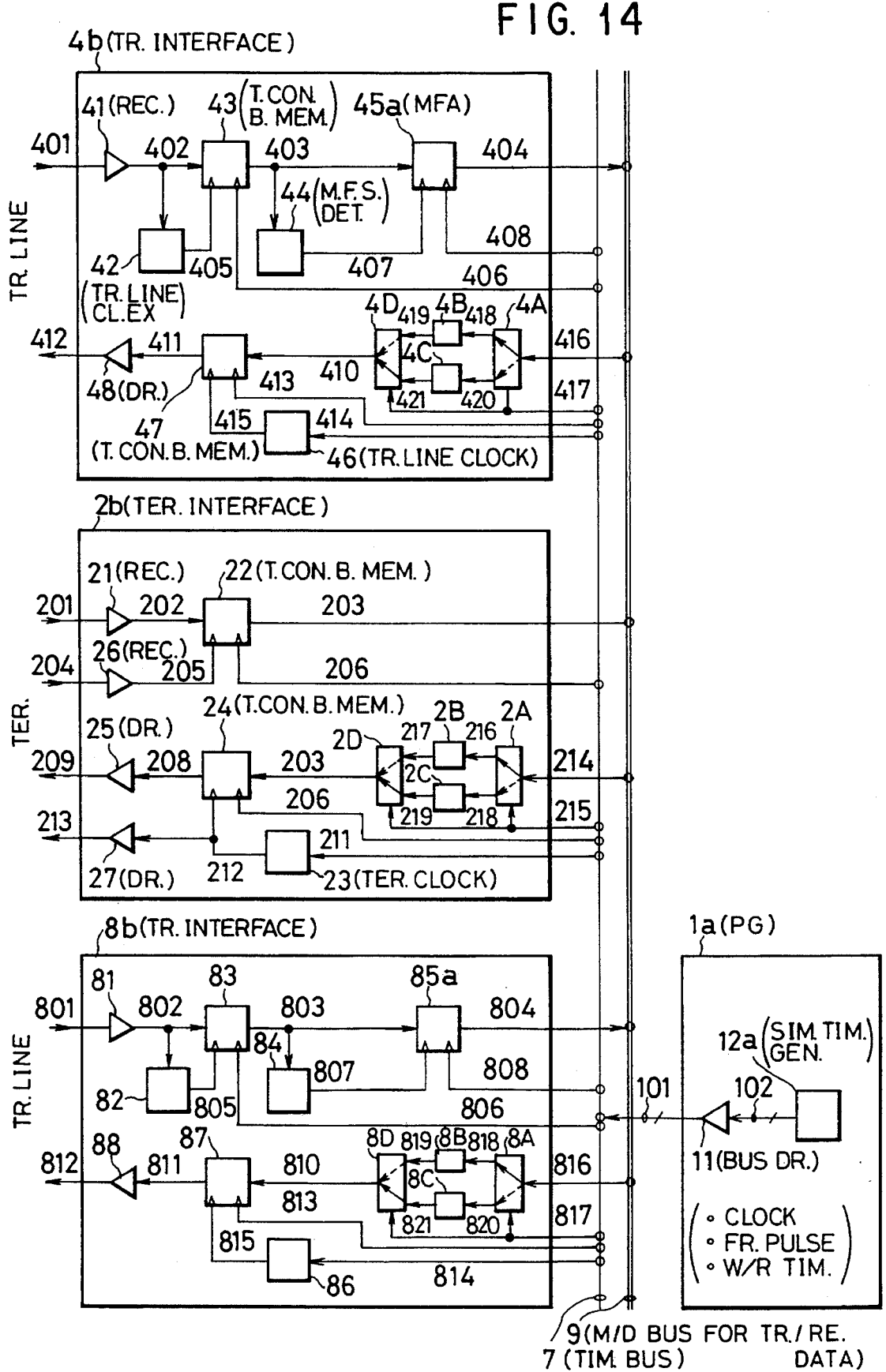
FIG. 14 shows a circuit configuration of a multiplexer having a distributed time-slot-conversion memory according to a second embodiment of the invention.

The following is an explanation of a multiplexer according to another embodiment of the invention. FIG. 14 shows a configuration of the multiplexer of this embodiment. In FIG. 14, a terminal interface 2*b* is connected to the terminal. Distributed time-slot-conversion memories 2B, 2C having memory capacities specified according to the terminal speed, and selectors 2A, 2D are provided. Transmission interfaces 4*b*, 8*b* are connected to the transmission line. Distributed time-slot-conversion memories 4B, 4C and 8B, 8C having memory capacities specified according to the transmission line speed, and selectors 4A, 4D and 8A, 8D are provided. Multiplexing/demultiplexing bus 9 for transmitting/received data transmits/receives the data between interfaces. The PG 1*a* and the timing bus 7 are the same as Embodiment 1.

Figure 15:
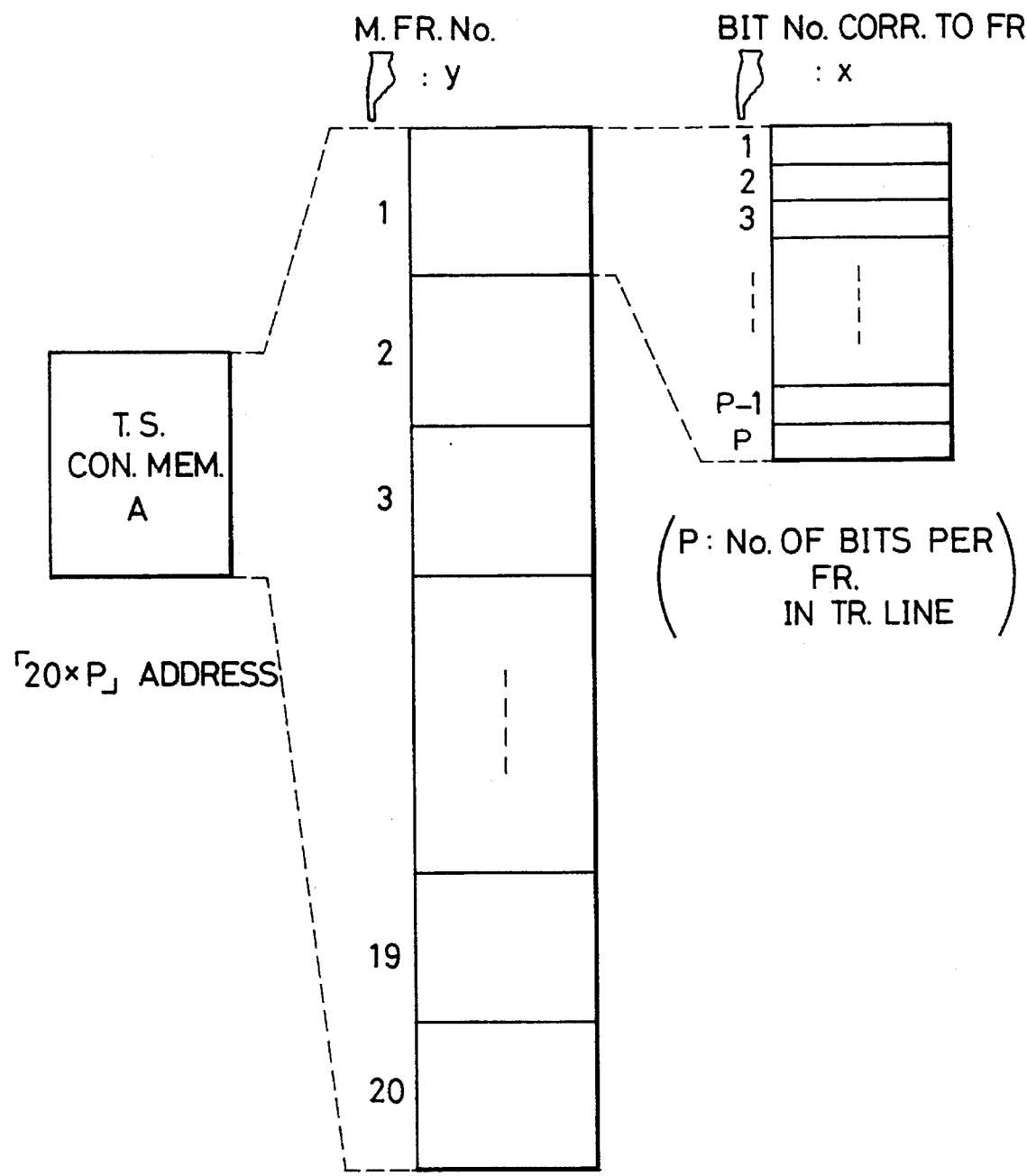
FIG. 15 shows the configuration of the distributed time-slot-conversion memory.

FIG. 15 shows a configuration of the distributed time-slot-conversion memory mounted in each interface shown in FIG. 14.

In FIG. 15, P shows the number of bits per frame. In case of the distributed time-slot-conversion memory mounted in the terminal interface, P shows the number of the terminal data (the decimals of the number are raised to a unit) per one frame period, 125 μsec. The capacity of the time-slot-conversion memories is 2×20×P=40P (addresses) including the memory A and the memory B.

The total amount of the capacity of the above memories becomes Σ40Pi<=40Z (i=1–n, n is maximum number of memories). The total amount of the capacity of the memories can be thus reduced compared with the case of the multiplexer including the TSI, in which the memory capacity of 2 multi-frame size (2×2×Z=40Z) is always required for exchanging the data. When the number of the interfaces is less, the system of the embodiment is more effective, that is, the total amount of the capacity of the memories can be more reduced.

Embodiment 3

Figure 16:
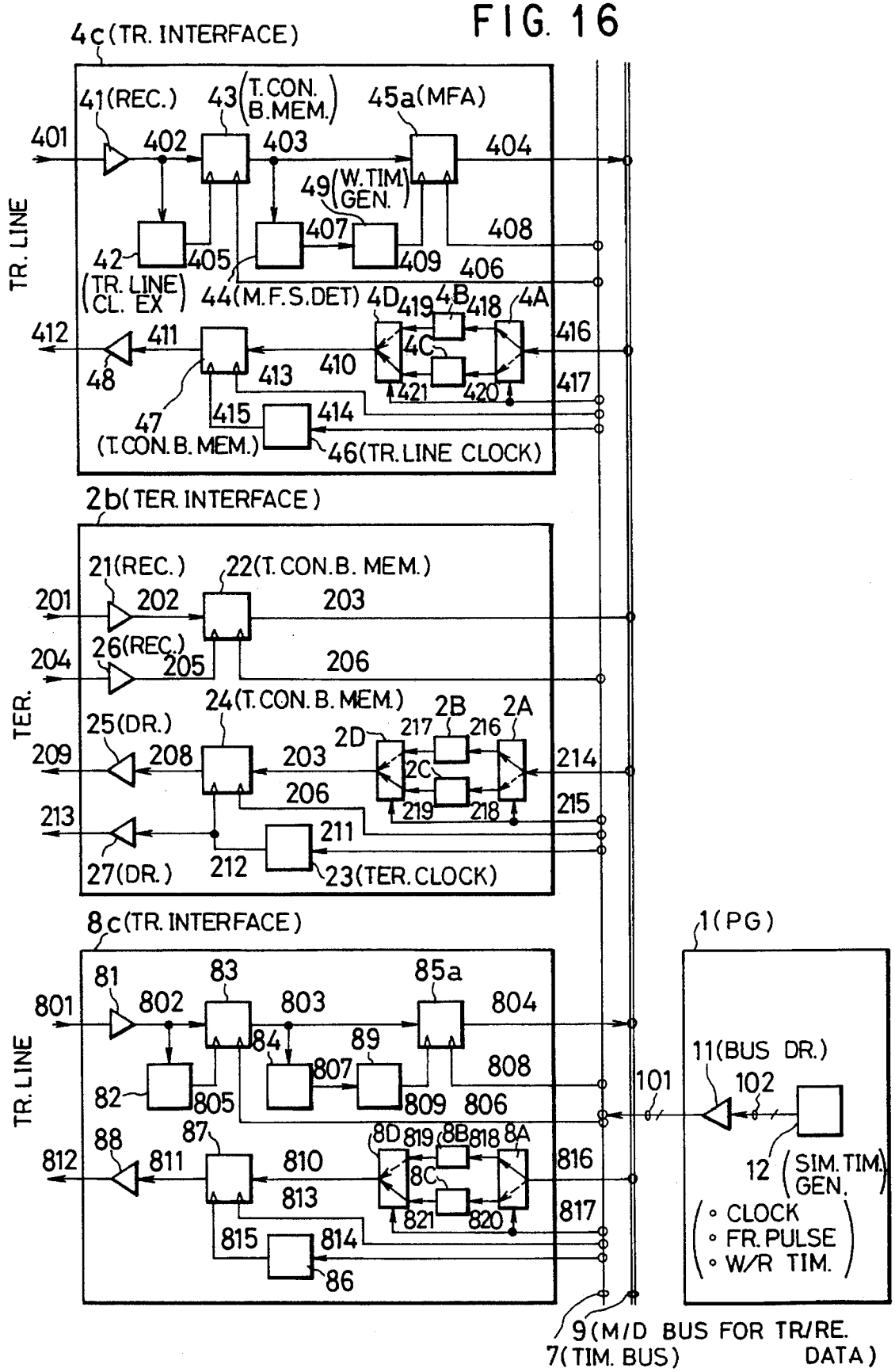
FIG. 16 shows a circuit configuration of a multiplexer according to a third embodiment of the invention.

FIG. 16 shows a configuration of a multiplexer using multi-frame alignment memories and distributed time-slot-conversion memories.

The write-timing pulse generator 49 is mounted in the transmission interface shown in FIG. 14. The difference of the timing between the timing of the received multi-frame in the transmission line and the timing of the multi-frame in the node for the received data from the transmission line is absorbed by the MFA with a multi-frame unit, which is changeable and is specified according to the transmission speed of the data in each channel. The delay can be thus reduced.

Embodiment 4

According to another embodiment of the multiplexing/demultiplexing system of the invention, the data is transmitted/received between the transmission interface and another transmission interface, or the transmission interface and the terminal interface with the specific frame unit. Multiplexing/demultiplexing method can be provided as described below with reducing the delay when the data is controlled to transmit between internal interfaces with a specific frame unit by the timing pulses generated by the simultaneous timing generator of the multiplexer. The time-slot-conversion memories can be concentrated and can be also distributed to each interface.

Figure 17:
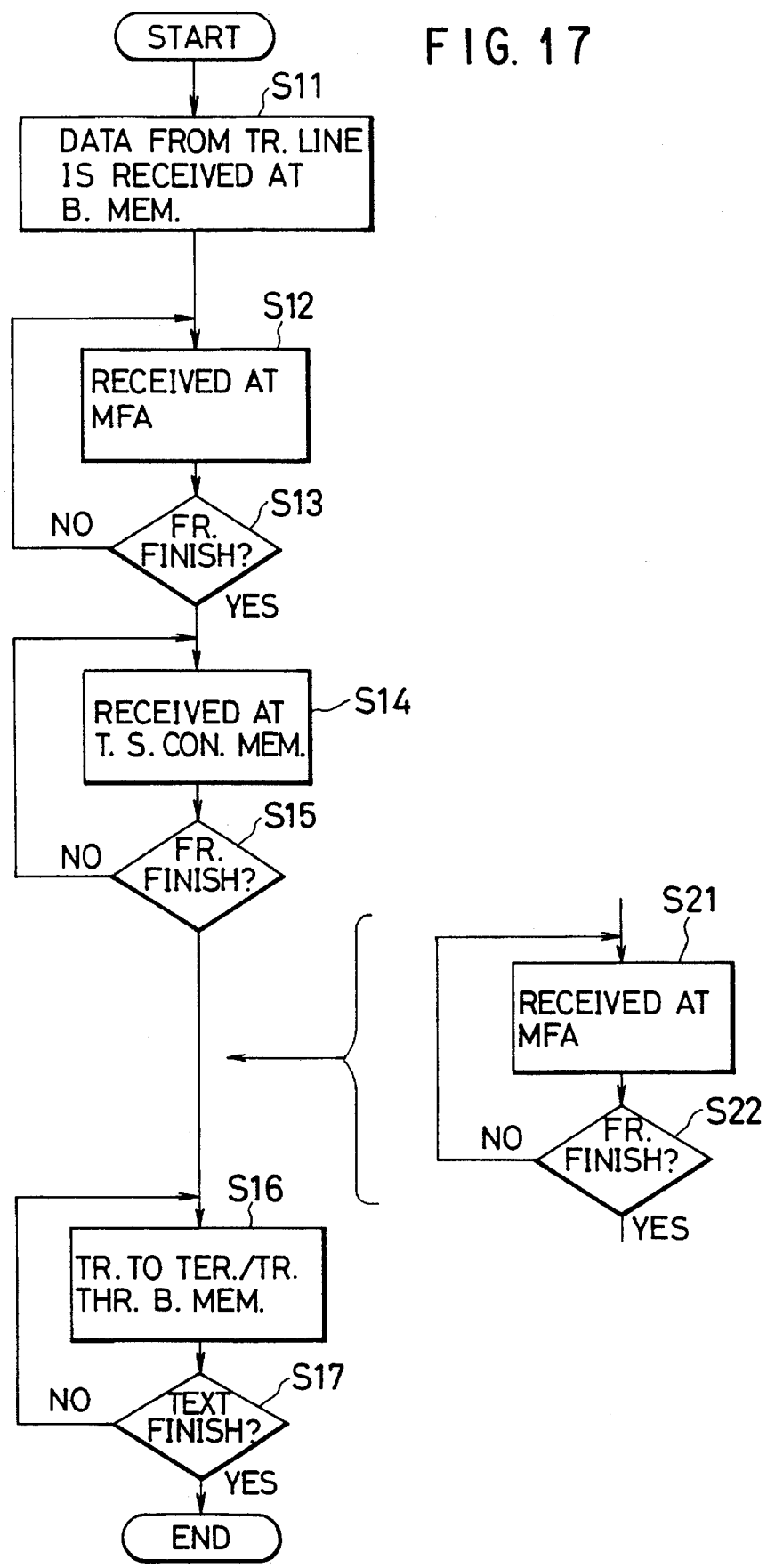
FIG. 17 is a flow chart showing multiplexing/demultiplexing method of the data according to a fourth embodiment of the invention.

FIG. 17 is a flow chart showing data multiplexing/demultiplexing procedure of the above-described multiplexer in which the time-slot-conversion memories are concentrated.

In FIG. 17, when the data is received from the transmission line, the start of the text is detected and the multiplexer starts to transmit the data to the predetermined node. At step S11, the timing generated for transmitting the data is converted by the timing-conversion buffer memory of the transmission interface of the received data, and the data is received and stored in the multi-frame-alignment memory (MFA) at step S12. At step S13, the transmitting unit of the data, which is predefined as a multi-frame size in each channel, is checked, and at step S14, the data is output to the time-slot-conversion memory. At step S16, the data is output to the timing-conversion buffer memory in the transmission interface of the transmitting data or the terminal interface based on the destination of the data. When the destined address of the data is one of the terminals, the data is output to the timing-conversion buffer memory of the terminal interface until the data of the text is transmitted to the end.

When the multiplexer is provided at the relay node, and the data received from one of the transmission interface is destined for another transmission interface, steps S21 and S22 are added, in which the data is output to the MFA of the transmission interface with the specific frame unit, between steps S15 and S16.

The process of steps from S12 to S13, from S14 to S15, and from S21 to S22 are repeated to execute at the same time, in which the data is transmitted with the frame unit specified in each interface.

When the data is received from one of the terminals of the multiplexer, steps S12 and S13 are not needed.

Another multiplexing/demultiplexing method, in which the time-slot-conversion memories are distributed to each interface, is explained below in reference to a flow chart of FIG. 18.

Figure 18:
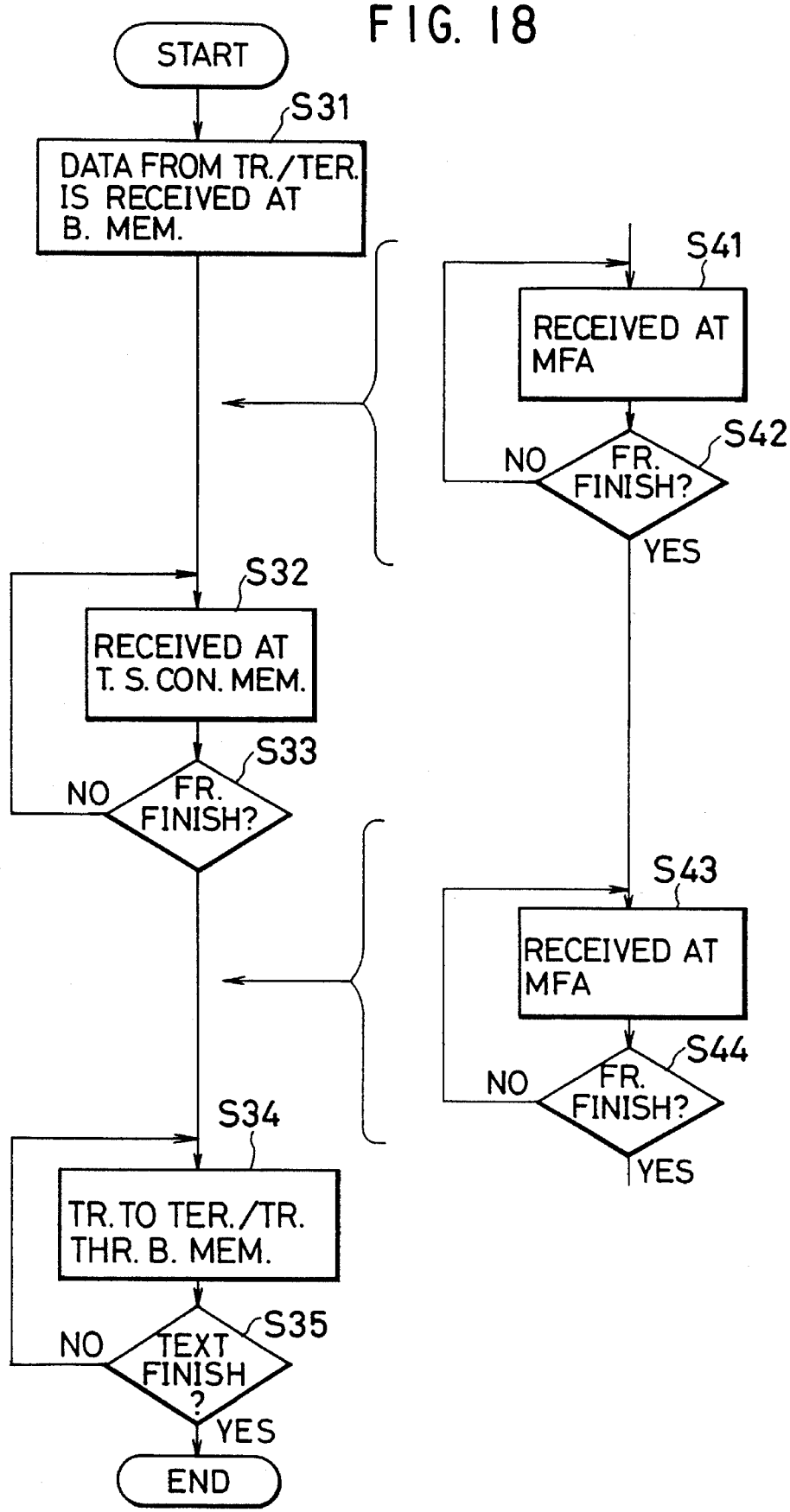
FIG. 18 is a flow chart showing another method of multiplexing/demultiplexing of the data.
Figure 19:
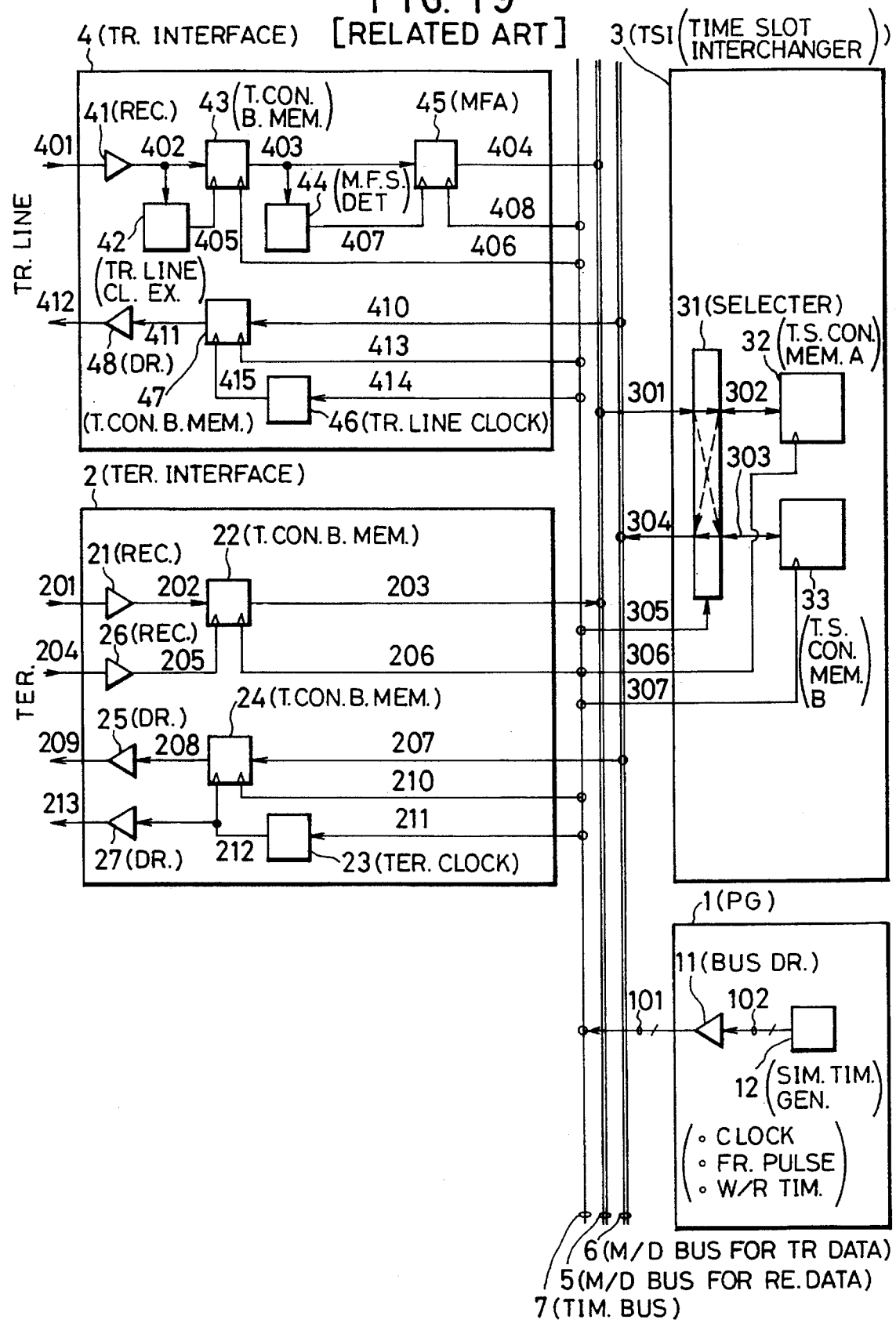
FIG. 19 shows a circuit configuration of a multiplexer at the transmitting/receiving node according to a conventional bit multiplexing system.
Figure 20:
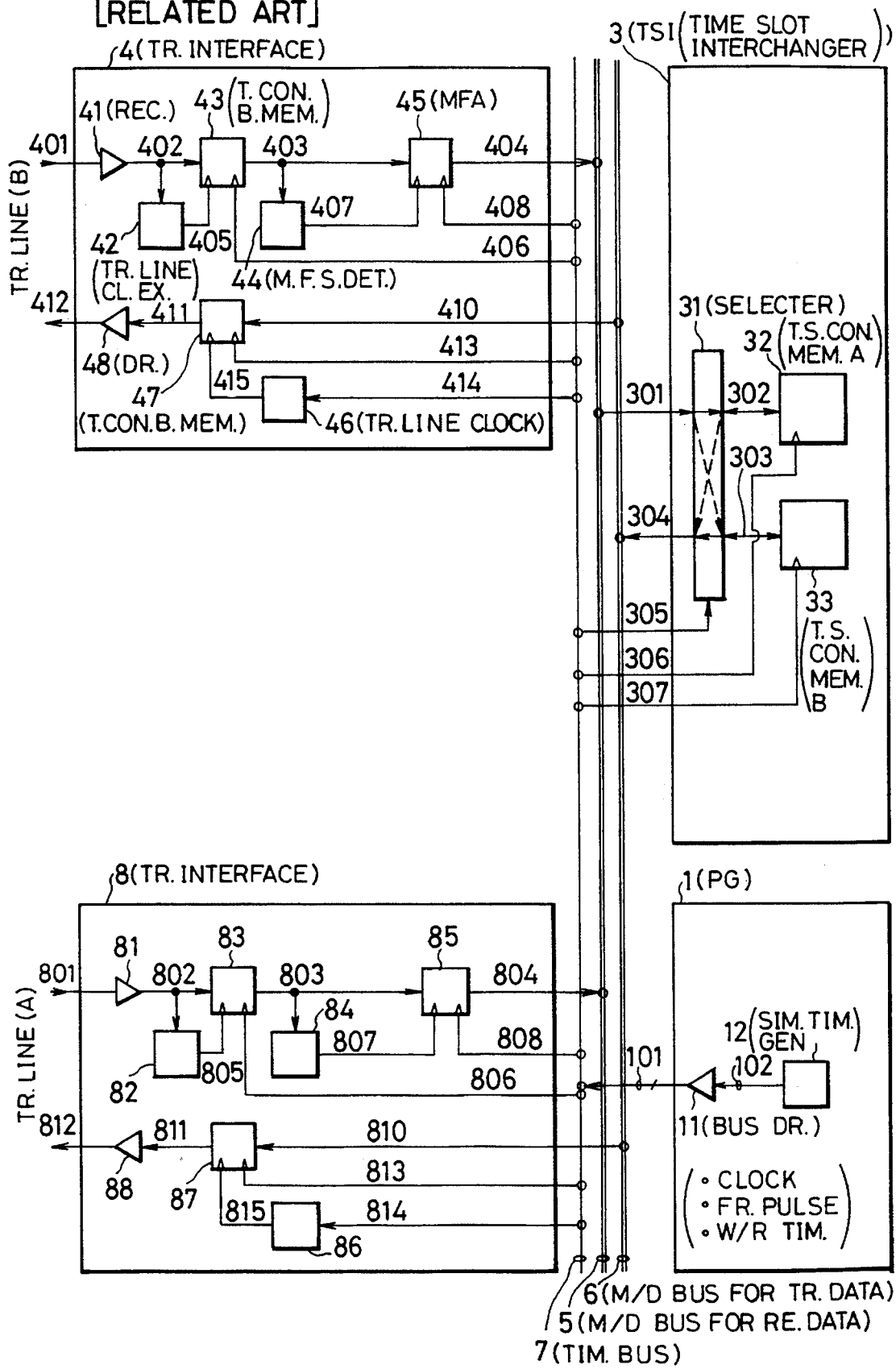
FIG. 20 shows a circuit configuration of the multiplexer at the relay node according to the conventional bit multiplexing system.
Figure 21:
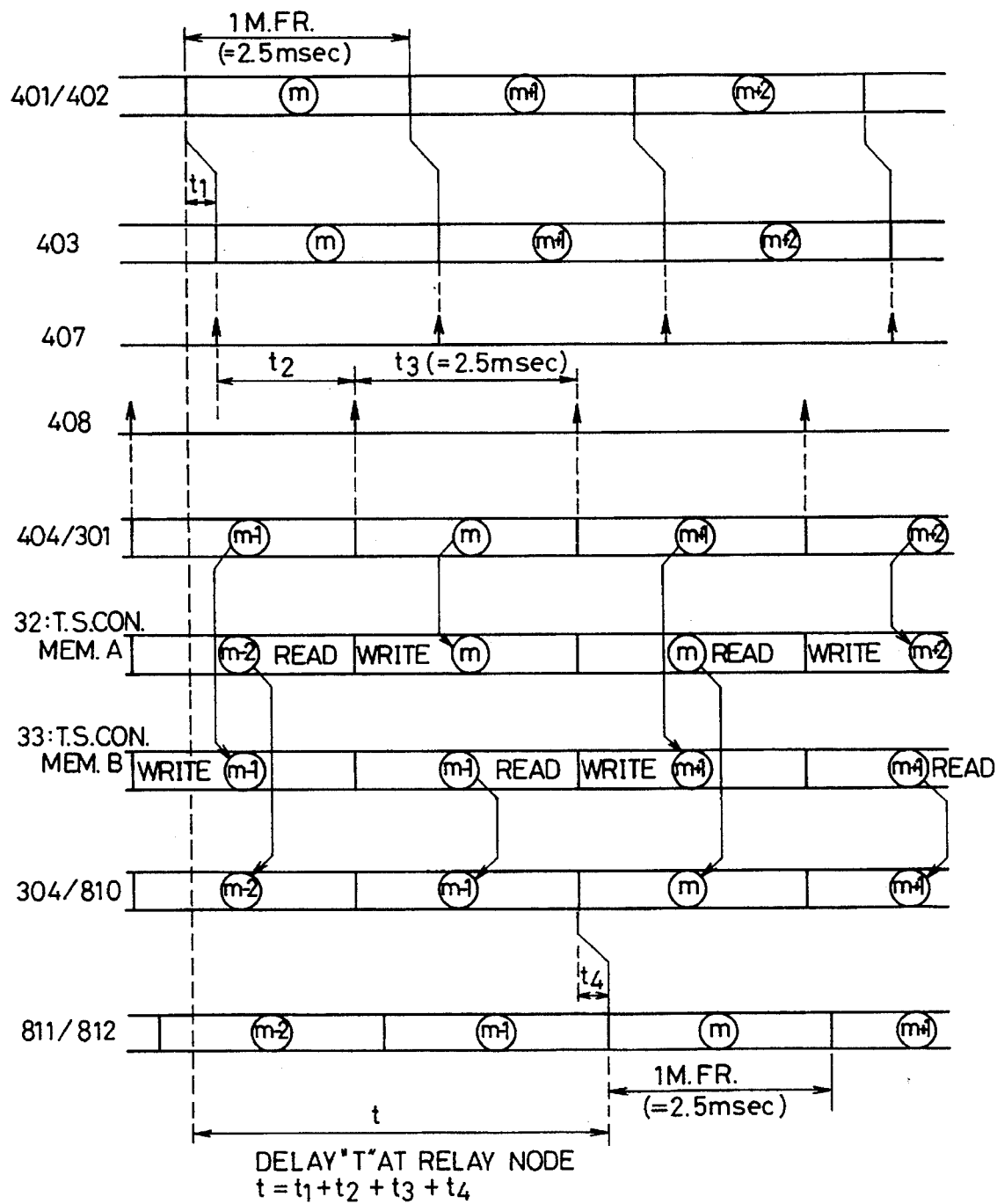
FIG. 21 shows operation timing at the relay node of the conventional bit multiplexing system.
Figure 22:
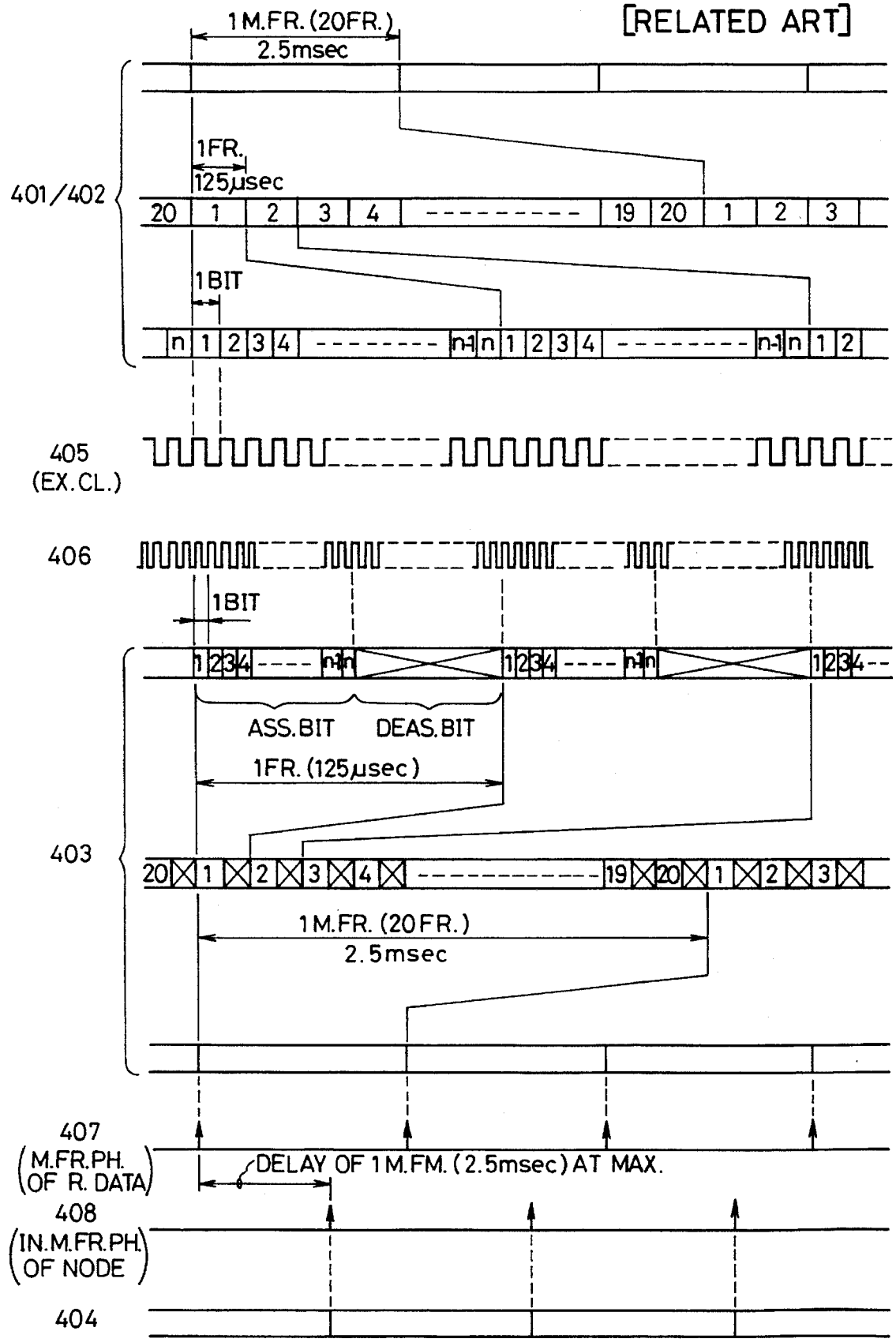
FIG. 22 shows receiving timing at the transmission interface of the conventional bit multiplexing system.

In FIG. 18, when data is received from the transmission line or the terminal, the start of the text is detected and the multiplexer starts to transmit the data to the predetermined node. At step S31, the timing generated for transmitting the data is converted by the timing-conversion buffer memory of the transmission interface of the received data. At step S32, the data is output to the distributed time-slot-conversion memory in the transmission interface of the transmitting data or the terminal interface based on the destination of the data and at step S33, the transmitting unit of the data, which is predefined as a multi-frame size in each channel, is checked. The data is transmitted to the timing-conversion buffer memory until the data of the text is transmitted to the end.

When the multiplexer is provided at the transmitting/ receiving node, steps S41 and S42 are added, in which the data is output to and stored in the MFA of the transmission interface of the received data when the data is from the transmission line, between steps S31 and S32. Steps S43 and S44 are added, in which the data is output to and stored in the MFA in the transmission interface of the transmitting data when the data is destined for another transmission line, between the steps S33 and S34 when the multiplexer is provided at the relay node.

Similarly to the method using the multiplexer with the timing-conversion memories concentrated, the process of steps from S41 to S42, from S32 to S33, and from S43 to S44 are repeated to execute at the same time, in which the data is transmitted with the frame unit specified in each interface.

As has been described, according to the present invention, the data is transmitted to/received from the terminal interface or the transmission interface with the specific frame unit by the memory which reads/writes the data with the specific frame unit. The delay which occurs in multiplexing/ demultiplexing the data at the transmitting/receiving node can thus be reduced including relaying at the relay node without lowering the multiplexing efficiency.

Further, according to the invention, the distributed memory, which is provided in each of the interfaces and reads/writes the data with the specific frame unit, transmits/ receives the data to/from the terminal interface or the transmission interface and the like. The delay which occurs in multiplexing/demultiplexing the data at the transmitting/ receiving node can be reduced including relaying at the relay node without lowering the multiplexing efficiency, and the less memory capacity is required.

Further, according to the invention, the distributed memory, which is provided in each of the interfaces, reads/ writes the data with the specific frame unit, and the multi- frame alignment memory transmits/receives the data to/from the terminal interface or the transmission interface and the like. The delay which occurs in multiplexing/demultiplexing the data at the transmitting/receiving node can be reduced including relaying at the relay node without lowering the multiplexing efficiency, and the less memory capacity is required.

While the invention has been shown and described in its preferred embodiments, it is to be understood that the words which have been used are words of description rather than limitation and that changes within the purview of the appended claims may be made without departing from the true scope and spirit of the invention in its broader aspects.

What is claimed is:

1. A time-division multiplexer using a multi-frame format for receiving data from transmission lines/terminals and for transmitting the data to another transmission lines/terminals in a communication system comprising:

(A) a multi-frame-alignment memory for aligning read- timing of the data with write-timing of the data from one of the transmission lines/terminals;

(B) a plurality of time-slot-conversion memories includ- ing means for writing the data from the multi-frame- alignment memory in the form of multi-frame formats each with a selected number of frame units in each multi-frame segment based on the transmission speed of the sending terminal and efficiency of the commu- nication system and for reading the written multi-frame format data; and (C) a timing pulse generator for providing read-timing of the data from the multi-frame-alignment memory in the multi-frame format having a selected number of frame units in each multi-frame segment, and for providing write-/read-timing of the multi-frame format data to/from the time-slot-conversion memories.

2. The time-division multiplexer according to claim 1, further comprising a second multi-frame-alignment memory for aligning reading a second group of data with writing the second group of data from another transmission line.

3. The time-division multiplexer according to claim 1, further comprising a write-timing pulse generator for pro- viding write-timing of the data into the multi-frame-align- ment memory.

4. The time-division multiplexer according to claim 1, wherein the multi-frame-alignment a buffer memory has memory area for buffering the data in the form of multi- frame formats each with the selected number of frame units.

5. The time-division multiplexer according to claim 1, wherein each time-slot-conversion memory has a buffer memory area for buffering the data in the form of multi- frame formats with the selected number of frame units from/to the multi-frame-alignment memory.

6. A time-division multiplexer using a multi-frame format for receiving data from transmission lines/terminals and for transmitting the data to other transmission lines/terminals in a communication system comprising:

(A) a plurality of distributed time-slot-conversion memo- ries placed in the transmission interface for writing the data from one of the lines/terminals, and including means for reading the data from the distributed time- slot-conversion memories in the form of multi-frame formats each with a selected number of frame units of the data in each multi-frame segment based on the transmission speed of the sending terminal and effi- ciency of the communication system and for reading the written multi-frame format data;

(B) a selector for selecting the distributed time-slot- conversion memories before writing/reading the data for receiving/transmitting; and, (C) a timing pulse generator for providing read-timing of the data from the distributed time-slot-conversion memories in the multi-frame format having the selected number of frame units in each multi-frame segment, and for switching the selectors with the selected num- ber of frame units.

7. A time-division multiplexer using a multi-frame format for receiving data from transmission lines/terminals and for transmitting the data to other transmission lines/terminals in a communication system comprising:

(A) a multi-frame-alignment memory for aligning read- timing of the data with write-timing of the data from one of the transmission lines/terminals;

(B) a plurality of distributed time-slot-conversion memo- ries placed in the transmission interface for writing the data from the multi-frame-alignment memory, and including means for reading the data from the distrib- uted time-slot-conversion memory in the form of multi- frame formats each with a selected number of frame units of the data in each multi-frame segment based on the transmission speed of the sending terminal and efficiency of the communication system and for reading the written multi-frame format data;

(C) a selector for selecting the distributed time-slot-conversion memories before writing/reading the data for receiving/transmitting; and (D) a timing pulse generator for providing read-timing of the data from the distributed time-slot conversion memories in the multi-frame format having the selected number of frame units in each multi-frame segment, and for switching the selector with the selected number of frame units.

8. The time-division multiplexer according to claim 7, further comprising a second multi-frame-alignment memory for aligning reading a second group of data with writing the second group of data from another transmission line.

9. The time-division multiplexer according to claim 7, further comprising a write-timing pulse generator for providing write-timing of the data into the multi-frame-alignment memory.

10. A method for multiplexing data from transmission lines/terminals in a communication system, including a plurality of time-slot-conversion memories, comprising the steps of:

(A) receiving data from one of the transmission lines/terminals through a first buffer memory to a multi-frame-alignment memory with each of specific frame units;

(B) transmitting the data from the multi-frame-alignment memory to the time-slot-conversion memories in the fort of multi-frame formats each with a selected number of frame unit of the data in each multi-frame segment based on the transmission speed of the sending terminal and efficiency of the communication system; and (C) transmitting the data from the time-slot-conversion memories to a second buffer memory for the terminal.

11. A method for multiplexing data from transmission lines/terminals in a communication system, including a plurality of time-slot-conversion memories, comprising the steps of:

(A) receiving data from one of the transmission lines/terminals through a buffer memory to a multi-frame-alignment memory with each of specific frame units of the data;

(B) transmitting the data from the multi-frame-alignment memory to the time-slot-conversion memory in the form of multi-frame formats each with a selected number of frame units of the data in each multi-frame segment based on the transmission speed of the sending terminal and efficiency of the communication system;

(C) transmitting the data from the time-slot-conversion memory to a second multi-frame-alignment memory in the form of multi-frame formats each with the selected number of frame units of the data; and (D) reading the data from the second multi-frame-alignment memory.

12. A method for multiplexing data from transmission lines/terminals in a communication system, including a plurality of distributed time-slot-conversion memories placed in each transmission interface, comprising the steps of:

(A) receiving data from one of the transmission lines/terminals through a buffer memory to a multi-frame-alignment memory with specific frame units of the data;

(B) transmitting the data from the multi-frame-alignment memory to the time-slot-conversion memory in the form of multi-frame formats each with a selected number of frame units of the data in each multi-frame segment based on the transmission speed of the sending terminal and efficiency of the communication system; and (C) reading the data from the distributed time-slot-conversion memory in the form of multi-frame formats each with the selected number of frame units of the data.

13. A method for multiplexing data from transmission lines/terminals in a communication system, including a plurality of distributed time-slot-conversion memories placed in each transmission interface, comprising the steps of:

(A) receiving data from one of the lines/terminals to a buffer memory;

(B) transmitting the data from the buffer memory to the distributed time-slot-conversion memory in the form of multi-frame formats each with a selected number of frame units of the data in each multi-frame segment based on the transmission speed of the sending terminal and efficiency of the communication system; and (C) reading the data from the distributed time-slot-conversion memory in the form of multi-frame formats each with the selected number of frame units of the data.

14. A network system comprising:

(A) a terminal for transmitting/receiving data;

(B) a multiplexer, including a multi-frame-alignment memory and a plurality of time-slot-conversion memories including means for writing and for reading the data in the form of multi-frame formats each with a selected number of frame units of the data in each multi-frame segment, the multiplexer including means for receiving the data from the terminal and transmission lines and for transmitting the data to other transmission lines.

15. A network system comprising:

(A) a terminal for transmitting/receiving data;

(B) a multiplexer, including a multi-frame-alignment memory and a plurality of distributed time-slot-conversion memories having means for writing and for reading the data in the form of multi-frame formats each with a selected number of frame units of the data in each multi-frame segment, the multiplexer including means for receiving the data from the terminal and transmission lines and for transmitting the data to other transmission lines.

* * * * *